(12) United States Patent
Ohara et al.

(10) Patent No.: US 7,205,061 B2
(45) Date of Patent: Apr. 17, 2007

(54) POLYMER ELECTROLYTE FUEL CELL

(75) Inventors: Hideo Ohara, Katano (JP); Toshihiro Matsumoto, Ibaraki (JP); Yasushi Sugawara, Higashiosaka (JP); Tatsuto Yamazaki, deceased, late of Moriguchi (JP); by Masayo Sugou, legal representative, Tokyo (JP); Junji Niikura, Hirakata (JP); Kazuhito Hatoh, Osaka (JP); Teruhisa Kanbara, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 573 days.

(21) Appl. No.: 10/181,987

(22) PCT Filed: Feb. 8, 2001

(86) PCT No.: PCT/JP01/00904

§ 371 (c)(1),
(2), (4) Date: Oct. 2, 2003

(87) PCT Pub. No.: WO01/59864

PCT Pub. Date: Aug. 16, 2001

(65) Prior Publication Data

US 2004/0170882 A1 Sep. 2, 2004

(30) Foreign Application Priority Data

Feb. 8, 2000 (JP) .............................. 2000-030044
Feb. 8, 2000 (JP) .............................. 2000-030045

(51) Int. Cl.
*H01M 8/02* (2006.01)
*H01M 8/10* (2006.01)

(52) U.S. Cl. .......................................... 429/35; 429/36

(58) Field of Classification Search ................... 429/35, 429/38, 36
See application file for complete search history.

(56) References Cited

U.S. PATENT DOCUMENTS 6,660,419 B1    12/2003   Nishida et al.

FOREIGN PATENT DOCUMENTS

| JP | 1-93061 | 4/1989 |
|----|---------|--------|
| JP | 6-338333 | 12/1994 |
| JP | 7-296828 | 11/1995 |
| JP | 8-180883 | 7/1996 |
| JP | 8-222237 | 8/1996 |
| JP | 9-147884 | 6/1997 |

(Continued)

*Primary Examiner*—Gregg Cantelmo
(74) *Attorney, Agent, or Firm*—McDermott Will & Emery LLP

(57) ABSTRACT

A polymer electrolyte fuel cell comprising: a plurality of conductive separator plates, each comprising a corrugated metal plate; an electrolyte membrane-electrode assembly inserted between the separator plates, the electrolyte membrane-electrode assembly including a hydrogen-ion conductive polymer electrolyte membrane having its periphery covered with a gasket, an anode attached to one side of the electrolyte membrane, and a cathode attached to the other side of the electrolyte membrane; and gas charge and discharge device for charging and discharging a fuel gas and an oxidant gas to and from the anode and the cathode, respectively, wherein the gas charge and discharge device charges and discharges the fuel gas to and from the anode through the grooves on one side of the corrugated metal plate and charges and discharges the oxidant gas to and from the cathode through the grooves on the other side of the corrugated metal plate.

4 Claims, 21 Drawing Sheets

FOREIGN PATENT DOCUMENTS

| | | |
|---|---|---|
| JP | 9-298064 | 11/1997 |
| JP | 10-199554 | 7/1998 |
| JP | 10-308227 | 11/1998 |
| JP | 11-185777 | 7/1999 |
| JP | 11-345620 | 12/1999 |
| JP | 11-345624 | 12/1999 |
| JP | 11-354142 | 12/1999 |
| WO | WO 00/01025 | 1/2000 |

POLYMER ELECTROLYTE FUEL CELL

TECHNICAL FIELD

The present invention relates to a polymer electrolyte fuel cell used for portable power sources, electric vehicle power sources, domestic cogeneration systems or the like, particularly to an improvement of conductive separator plates used therein.

BACKGROUND ART

A fuel cell comprising a polymer electrolyte membrane generates electric power and heat simultaneously by electrochemically reacting a fuel gas containing hydrogen and an oxidant gas containing oxygen such as air. This fuel cell is basically composed of a polymer electrolyte membrane for selectively transporting hydrogen ions and a pair of electrodes formed on both surfaces of the polymer electrolyte membrane, i.e., an anode and a cathode. The electrode usually comprises a catalyst layer which is composed mainly of carbon particles carrying a platinum group metal catalyst and is formed on the surface of the polymer electrolyte membrane and a diffusion layer which has both gas permeability and electronic conductivity and is formed on the outer surface of the catalyst layer.

In order to prevent the fuel gas and oxidant gas supplied to the electrodes from leaking out or prevent these two kinds of gases from mixing together, gaskets are arranged on the periphery of the electrodes with the polymer electrolyte membrane therebetween. The gaskets are normally composed of a rubber or an elastomer having high chemical resistance such as EPDM rubber, silicone elastomer and fluoro-elasomer. The gaskets are combined integrally with the electrodes and polymer electrolyte membrane beforehand. This is called "MEA" (electrolyte membrane-electrode assembly). Disposed outside the MEA are conductive separator plates for mechanically securing the MEA and for connecting adjacent MEAs electrically in series, or in some cases, in parallel. The separator plates have a gas flow channel for supplying a reaction gas to the electrode surface and for removing a generated gas and an excess gas at a portion to come in contact with the MEA. Although the gas flow channel may be provided separately from the separator plates, grooves are usually formed on the surfaces of the separator plates to serve as the gas flow channel.

In order to supply the fuel gas and oxidant gas to such grooves, it is necessary to use piping jigs which branch respective supply pipes for fuel gas and oxidant gas, depending on the number of the separator plates to be used, and connect the branches directly to the grooves of the separator plates. This jig is called "manifold", and the above-described type, directly connecting the supply pipes for fuel gas and oxidant gas with the grooves, is called "external manifold". A manifold having a simpler structure is called "internal manifold". In the internal manifold, the separator plates with the gas flow channel formed thereon are provided with through holes which are connected to the inlet and outlet of the gas flow channel such that the fuel gas and oxidant gas are supplied directly from these holes.

Since the fuel cell generates heat during operation, it needs cooling with cooling water or the like to keep the cell under good temperature conditions. Normally, a cooling section for flowing the cooling water therein is formed every one to three cells. The cooling section is inserted between the separator plates in one structure and the cooling section is formed by providing the backsides of the separator plates with a cooling water flow channel in the other structure, and the latter is often employed. In a general structure of the fuel cell, the MEAs, separator plates and cooling sections are alternately stacked to form a stack of 10 to 200 cells, and the resultant stack is sandwiched by end plates with current collector plates and insulating plates and is clamped with clamping bolts from both sides.

In such a polymer electrolyte fuel cell, the separator plates need to have a high conductivity, high gas tightness with respect to the fuel gas, and high corrosion resistance to oxidation/reduction reactions of hydrogen/oxygen. For such reasons, conventional separator plates have usually been formed from carbon materials such as glassy carbon and expanded graphite, and the gas flow channel has been formed by cutting the surface thereof or by molding in the case of expanded graphite. In recent years, however, an attempt is made to use a metal plate such as stainless steel in place of the conventionally used carbon materials.

The conventional method of cutting the carbon plate has a difficulty in reducing not only the material cost of the carbon plate but also the cutting cost, while the method of using the expanded graphite is also costly with respect to the material, which is considered to be a hindrance to practical use.

The method using the metal plate proposes to produce a separator plate by press working in order to reduce the cost. However, it has a problem that the cost merit is consequently impaired by the limitation of the pattern of the gas flow channel worked on the separator plate and the necessity to use post-treatment for removing the distortion caused by the press and a special material having a high extensibility.

DISCLOSURE OF INVENTION

An object of the present invention is to provide gas charge and discharge means suitable for mass-production by basically using a corrugated metal plate as a conductive separator plate and combining it with a gasket such that grooves formed on both sides of the corrugated metal plate function as gas flow channels.

The present invention provides a polymer electrolyte fuel cell comprising: a plurality of conductive separator plates, each comprising a corrugated metal plate having ridges and grooves that are alternately formed in parallel such that the ridges and grooves on one side correspond to the grooves and ridges on the other side, respectively; an electrolyte membrane-electrode assembly inserted between the separator plates, the electrolyte membrane-electrode assembly including a hydrogen-ion conductive polymer electrolyte membrane having its periphery covered with a gasket, an anode attached to one side of the electrolyte membrane, and a cathode attached to the other side of the electrolyte membrane; and gas charge and discharge means for charging and discharging a fuel gas and an oxidant gas to and from the anode and cathode, respectively, wherein the gas charge and discharge means charges and discharges the fuel gas to and from the anode through the grooves on one side of the corrugated metal plate and charges and discharges the oxidant gas to and from the cathode through the grooves on the other side of the corrugated metal plate.

In a preferred mode of the present invention, the gas charge and discharge means comprises: manifolds for gases; and gas guide grooves formed on the gasket of the electrolyte membrane-electrode assembly (hereinafter referred to as MEA) for connecting the manifolds with the grooves of the corrugated metal plate.

In another preferred mode of the present invention, the gas charge and discharge means comprises: manifold apertures formed in common on the corrugated metal plate and the gasket of the MEA; and packings arranged on the corrugated metal plate, and the fuel gas and oxidant gas are charged and discharged through the manifold apertures and grooves of the corrugated metal plate to and from the anode and cathode, respectively.

In still another preferred mode of the present invention, the conductive separator plate comprises the corrugated metal plate and a second gasket covering its periphery, and the gas charge and discharge means comprises: manifold apertures formed in common on the gasket of the MEA and the second gasket; and gas guide grooves formed on the second gasket for connecting the manifold apertures with the grooves of the corrugated metal plate.

The conductive separator plate including the second gasket has a sealing material that is to be filled into the bottom of the grooves of the corrugated metal plate such that the depth of the grooves of the corrugated metal plate is almost equal to the depth of the gas guide grooves for connecting the manifold apertures with the grooves of the corrugated metal plate.

In still another preferred mode of the present invention, two corrugated metal plates are inserted between adjacent MEAs in such a manner that the grooves of the two corrugated metal plates face each other and the ridges thereof face each other, and cooling water is passed through flow channels formed by the grooves of the two corrugated metal plates from openings at one end toward openings at the other end.

In another mode of the present invention, both ends of the grooves of the corrugated metal plates forming the flow channels of cooling water are provided with a cooling water manifold aperture in common with other corrugated metal plates.

BEST MODE FOR CARRYING OUT THE INVENTION

Figure 1:
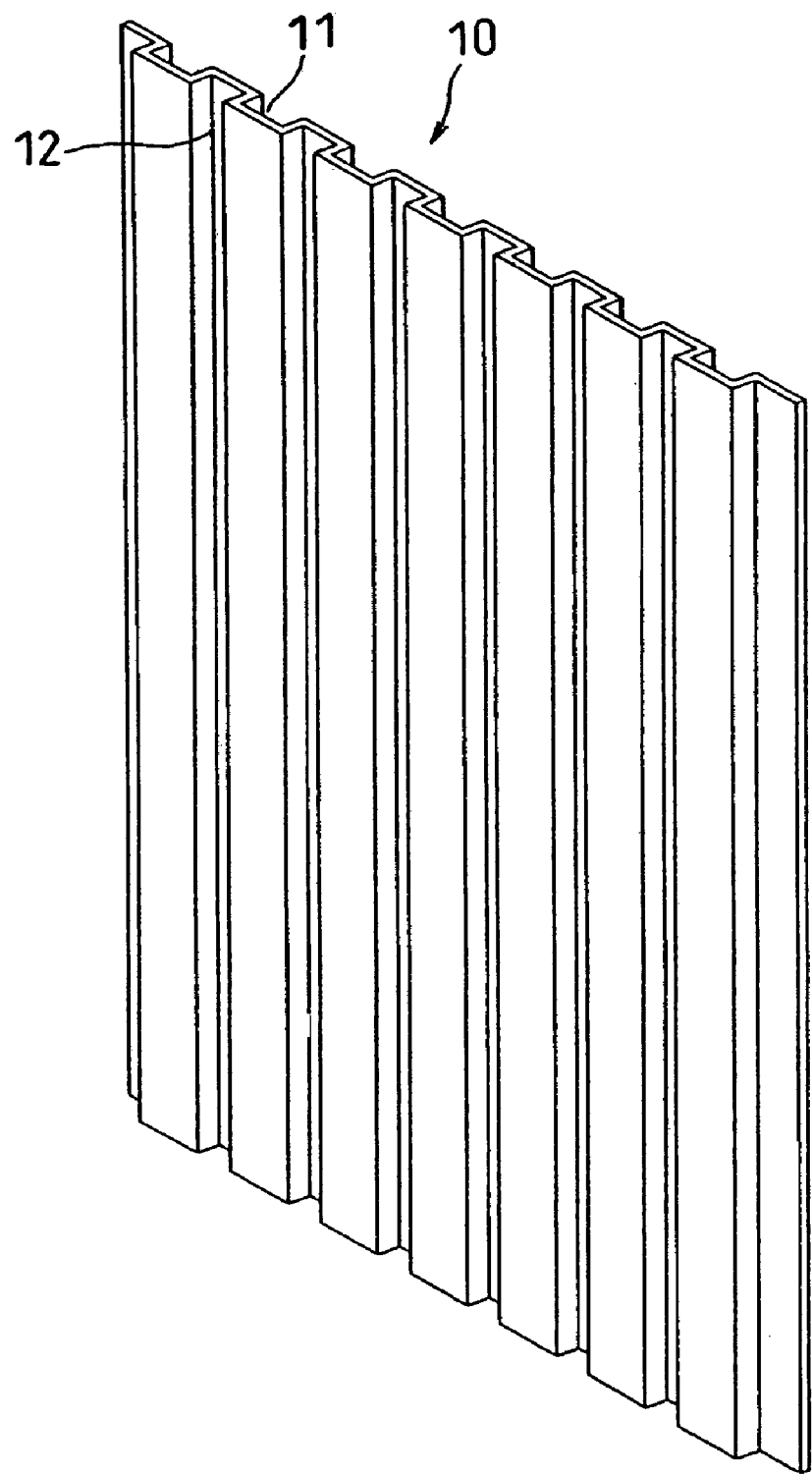
FIG. 1 is a perspective view illustrating an example of a corrugated metal plate constituting a conductive separator plate in accordance with the present invention.

As described above, the present invention forms gas charge and discharge means by using a corrugated metal plate as a conductive separator plate and combining it with a gasket of an MEA and/or a gasket of the separator plate itself such that grooves formed on both sides of the corrugated metal plate function as gas flow channels.

In the first embodiment of the representative conductive separator plate in accordance with the present invention, the corrugated metal plate has almost the same size as the MEA, and the corrugated metal plates and MEAs are alternately stacked to form a cell stack. In the second embodiment, the corrugated metal plate is combined with a gasket covering its periphery to form a conductive separator plate having almost the same size as the MEA, and the conductive separator plates and MEAs are alternately stacked to form a cell stack.

In the first and second embodiments, a cooling section is inserted between the MEAs as appropriate. In the first embodiment, two corrugated metal plates are combined in such a manner that their grooves face each other and are inserted between the MEAs as the cooling section. Cooling water flow channels are formed by the opposing grooves of the corrugated metal plates. In the second embodiment, an anode-side conductive separator plate and a cathode-side conductive separator plate are inserted between the MEAs, so that cooling water flow channels are formed between both conductive separator plates by the grooves of the corrugated metal plates.

A preferable fuel cell according to the first embodiment comprises a plurality of conductive separator plates of corrugated metal plates and an MEA inserted between the separator plates. A gasket of the MEA has, on both sides, ribs that close both ends, in the longitudinal direction, of the grooves of the opposing corrugated metal plates. The gasket further has, at an inner side of the ribs, guide grooves formed on one side so as to open to a side face of the gasket for guiding a fuel gas into the grooves of the corrugated metal plate and guide grooves formed on the other side so as to open to a side face of the gasket for guiding an oxidant gas into the grooves of the corrugated metal plate. According to this structure, by combining the guide grooves with respective manifolds for fuel gas and oxidant gas, it is possible to form means for charging and discharging the fuel gas and oxidant gas to and from an anode and a cathode at opposing positions of the corrugated metal plate.

In the above-mentioned fuel cell, the ribs closing the ends of the grooves of the corrugated metal plate may be integrally jointed to the corrugated metal plate by injection molding or the like instead of forming them on the gasket of the MEA. When the cooling section is provided between the MEAs, two corrugated metal plates are combined such that their grooves face each other and the grooves form flow channels through which cooling water is passed.

In still another modified example, manifold apertures for fuel gas and oxidant gas are provided on the corrugated metal plate instead of the gas guide grooves formed on the gasket of the MEA. These manifold apertures are formed in every other groove facing the MEA. The gas flowing into the groove having the manifold apertures is allowed to move into the groove having no manifold aperture by penetrating the groove that is formed on the other side between both grooves. At the penetrating portion, a packing having a notch is formed and holes through which the gas flows are formed in the corrugated metal plate, in order to prevent the gas from flowing into the groove formed on the other side. Such gas flow controlling means including a packing allows the oxidant gas and fuel gas to be distributed from the groove having the manifold apertures into the groove having no manifold aperture.

In the second embodiment, the conductive separator plate is composed of the corrugated metal plate and the gasket attached to its periphery. In a representative example, the separator plate is provided with manifold apertures in the same manner as the separator plate made of a carbon plate by cutting work or the like. Further, the gasket portion is provided with guide grooves for connecting the manifold apertures with the grooves of the corrugated metal plate.

In any embodiment, since the corrugated metal plate having a simple shape is used, effective mass production and significant cost reduction are possible. Also, since the thickness of the separator plate can be reduced, it is possible to make the fuel cell more compact.

The material used for the corrugated metal plate in accordance with the present invention is preferably a thin plate with a thickness of about 0.05 to 0.3 mm, such as stainless steel and titanium, having good electric conductivity and capable of easy formation into a corrugated shape by press working or the like. The surface of the metal thin plate is preferably coated with a corrosion resistant conductive film. The conductive film is preferably composed of gold, platinum, conductive carbon paint, a conductive inorganic oxide, nitride, or carbide such as $RuO_2$, tin oxide doped with indium $Sn(In)O_2$, TiN, TiAlN and SiC, or the like. It is preferable to form the conductive film after the material of the metal plate is press worked into a corrugated shape. The conductive film is formed by vacuum deposition, electron beam, sputtering, high frequency glow discharge decomposition, etc.

The material used for the gaskets of the MEA and conductive separator plate in accordance with the present invention is a thermoplastic resin or thermoplastic elastomer. Preferable material is selected from the group consisting of ethylene-propylene-diene terpolymer mixture (hereinafter referred to as EPDM), polyethylene, polypropylene, polybutylene, polystyrene, poly vinyl chloride, poly vinylidene chloride, poly vinyl alcohol, polyacrylamide, polyamide, polycarbonate, polyacetal, polyurethane, silicone, polybutylene terephthalate, polyethylene terephthalate, polyethylene naphthalate, syndiotactic polystylene, polyphenylene sulfide, polyether ether ketone, polyether ketone, liquid crystal polymer, fluorocarbon resin, polyether nitrile, modified polyphenylene ether, polysulfone, polyethersulfone, polyarylate, polyamide-imide, polyether-imide and thermoplastic polyimide.

In the following, embodiments of the present invention will be described in detail with reference to drawings. Since the drawings are used for facilitating understanding, relative size and location of each element are not necessarily accurate.

Embodiment 1

FIG. 1 illustrates a corrugated metal plate 10 produced by press working a metal plate such as stainless steel. In this embodiment, the corrugated metal plate is used as a conductive separator plate as it is. The corrugated metal plate 10 has, on one side, alternating grooves 11 and ridges and has, on the other side, ridges and grooves 12 corresponding to the grooves 11 and the ridges.

Figure 2:
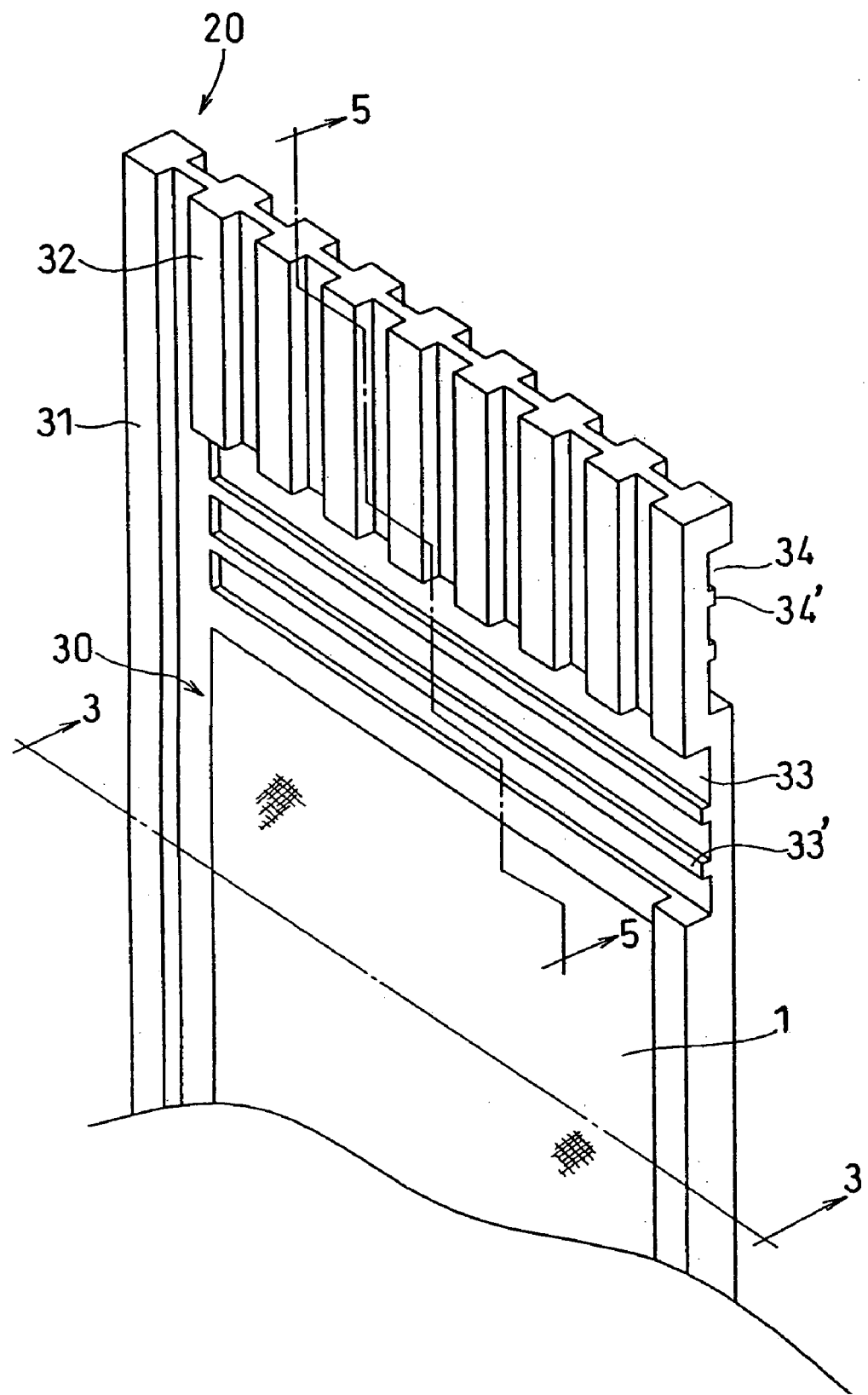
FIG. 2 is a perspective view of the vital part of an MEA in an example of the present invention.
Figure 3:
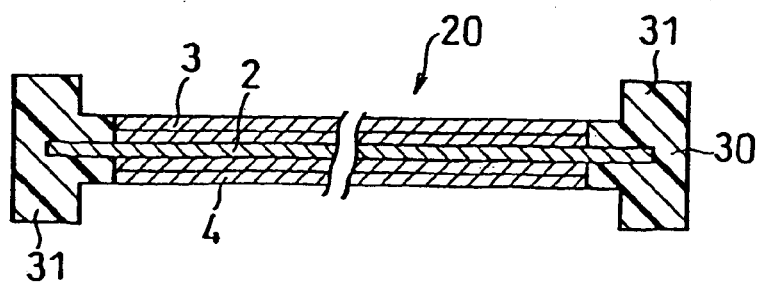
FIG. 3 is a cross-sectional view of FIG. 2 cut by line 3—3.

FIG. 2 and FIG. 3 illustrate an MEA 20, which is alternately stacked with the conductive separator plate of the corrugated metal plate to form a cell stack. As shown in FIG. 3, the MEA 20 comprises a polymer electrolyte membrane 2, a gasket 30 that unitarily covers the periphery of the membrane 2 and is composed of a thermoplastic resin or thermoplastic elastomer, and a cathode 3 and an anode 4 attached to exposed surfaces of the membrane 2. The cathode and anode are composed of a catalyst layer on the electrolyte membrane side and a gas diffusion layer. The electrolyte membrane 2 becomes self-supporting when combined with the gasket 30 and is thus easy to handle.

The MEA 20 as shown here is a rectangle having the same size as that of the metal plate 10, and has, on both ends in the longitudinal direction, an element for constituting gas charge and discharge means in cooperation with the metal plate 10. Specifically, the gasket 30 has an oxidant gas guide groove 33 that is formed on a cathode-side so as to open to a side face and a fuel gas guide groove 34 that is formed on an anode-side. The gasket 30 further has ribs 32 that are formed at an end part of the cathode-side which is located at an outer portion of the groove 33 so as to fit into the grooves of the metal plate 10 and similar ribs that are formed at an end part of the anode-side which is located at an outer portion of the groove 34 so as to fit into the grooves of the metal plate.

Although FIG. 2 illustrates one end of the MEA 20 in the longitudinal direction, the other end is also provided with a similar gas guide groove and ribs. Please refer to FIG. 9 for this.

Figure 4:
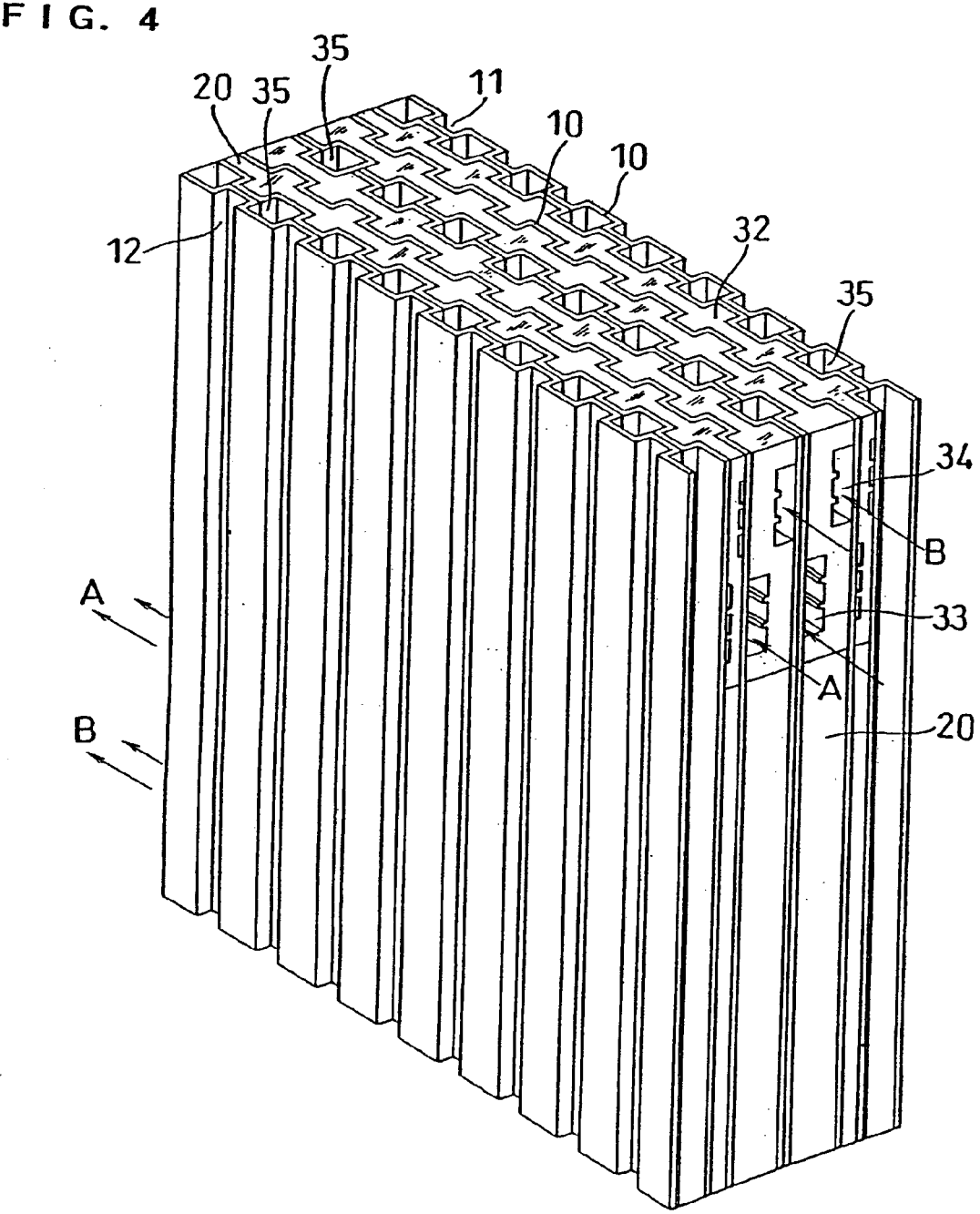
FIG. 4 is a perspective view illustrating a cell stack.

FIG. 4 illustrates a cell stack. In this example, a cooling section is formed every two cells. The cooling section is composed of two corrugated metal plates that are combined such that their grooves face each other. Cavities 35 formed by the grooves serve as cooling water flow channels. In FIG. 4, cooling water is introduced from above the cell stack into the flow channels 35 and is discharged from below.

The cell stack is formed by stacking the metal plates 10 and MEAs 20 alternately such that the ribs 32 of the MEAs fit into the grooves 11 or 12 of the metal plates 10. Thus, between the MEA 20 and the metal plate 10 stacked on the cathode-side thereof, flow channels for oxidant gas are formed by the grooves 11 of the metal plate 10. The flow channels are closed by the ribs 32 in the upper part of FIG. 4 and are closed by similar ribs in the lower part. Herein, the groove 33 formed so as to open to the side face of the MEA 20 communicates with the grooves 11 forming the flow channels for oxidant gas. Thus, by combining oxidant gas manifolds to the side faces of the cell stack, the oxidant gas is introduced into the grooves 11 of the metal plate from the guide groove 33 of the gasket 30 and is discharged to the manifold from the other guide groove of the gasket 30, as shown by arrows A of FIG. 4.

Meanwhile, the fuel gas is introduced into the grooves 12 of the metal plate 10 from a manifold combined to the side face of the cell stack via the guide groove 34 of the gasket 30 and is discharged to another manifold from the guide groove of the gasket 30, as shown by arrows B of FIG. 4.

In this way, the oxidant-gas and fuel gas are diffused throughout the electrodes in the grooves 11 and 12 of the corrugated metal plate, respectively, to participate in reactions. Then, excessive gases and products are discharged from the same grooves to the manifold on the outlet-side.

Figure 5:
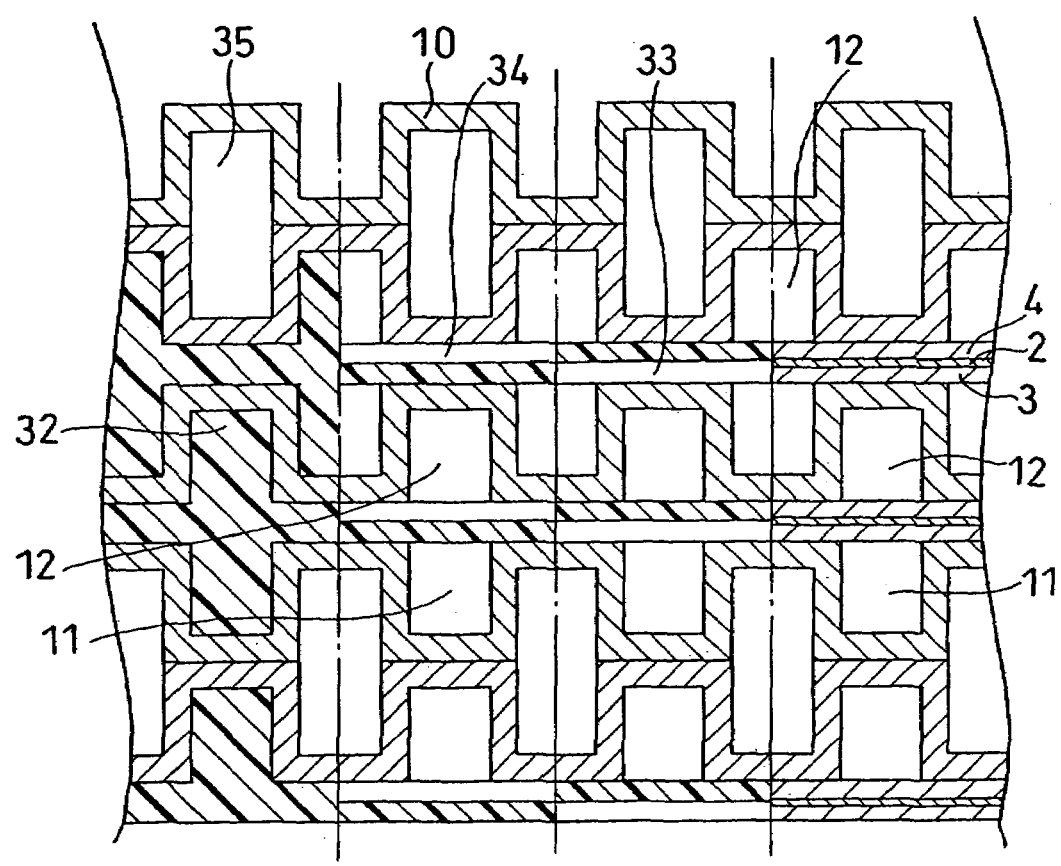
FIG. 5 is a cross-sectional view of the same stack cut by line 5—5 of FIG. 2.

As shown in FIG. 5, the corrugated metal plates sandwiching the MEA may be preferably placed such that the grooves 11 and 12 face each other. This prevents an excessive shearing force from applying to the electrode portion.

Figure 6:
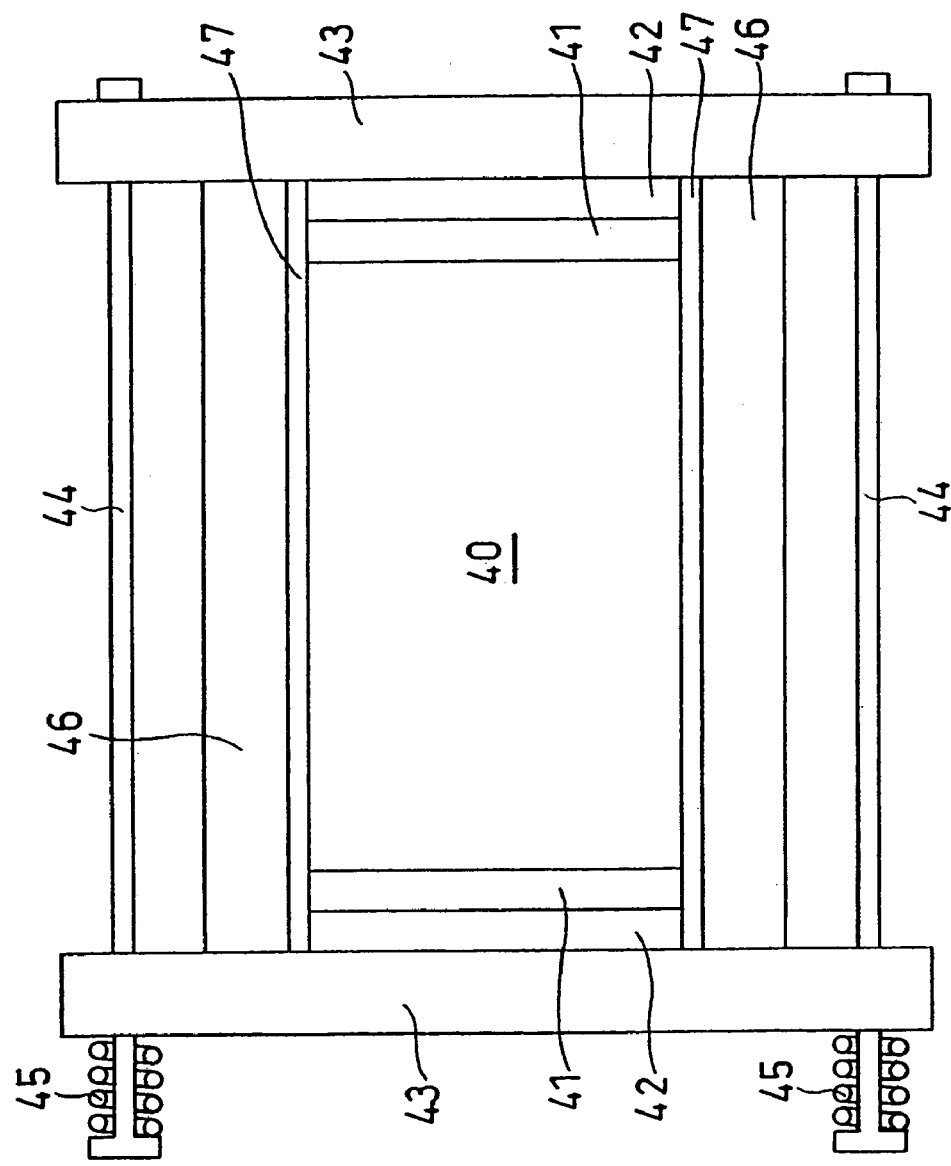
FIG. 6 is a front view of a cell system comprising the same stack.

FIG. 6 illustrates a fuel cell comprising the above-described cell stack. Numeral 40 represents the cell stack, and the gas inlet side and the outlet side in FIG. 4 are positioned at the upper part and the lower part in FIG. 6. The cell stack 40 is joined to a current collector plate 41, an insulating plate 42 and an end plate 43 at each end of the stacking direction; at upper and lower parts, the cell stack 40 is combined to a manifold 46 with a sealing material 47 composed of, for example, a silicone resin, interposed therebetween. Further, the end plates are clamped by rods 44, thereby to form a fuel cell. Numeral 45 represents a spring.

The guide grooves 33 and 34 of the gasket 30 of the MEA 20 as shown in FIG. 2 may be provided with a porous material having gas permeability such as carbon paper. In FIG. 2, two parallel ribs 33' and 34' are formed in the grooves 33 and 34 for preventing the gasket from deforming into the grooves 11 or 12 of the metal plate 10 to avoid inhibition of gas circulation. When the porous material is arranged in the guide grooves 33 and 34, the above-described ribs may be omitted. Instead of the porous material, the corrugated metal plate may be arranged as a spacer. As for the porous material and the spacer of the corrugated metal plate, their surfaces are preferably subjected to a treatment to make them hydrophilic. This hydrophilicity treatment is conducted in order to prevent condensation of humidifying water contained in the gas being supplied to the electrode, generated water released from the electrode or the like on the porous material or spacer and thereby prevent the blockage of the flow channel.

Embodiment 2

In Embodiment 1, in order to prevent the leakage of the gas between the edge of the metal plate 10 and the MEA, the ribs 31 and 32 or the like were formed on the gasket 30 of the MEA. In Embodiment 2, the function of these ribs is moved from the gasket 30 to the metal plate 10 side.

Figure 7:
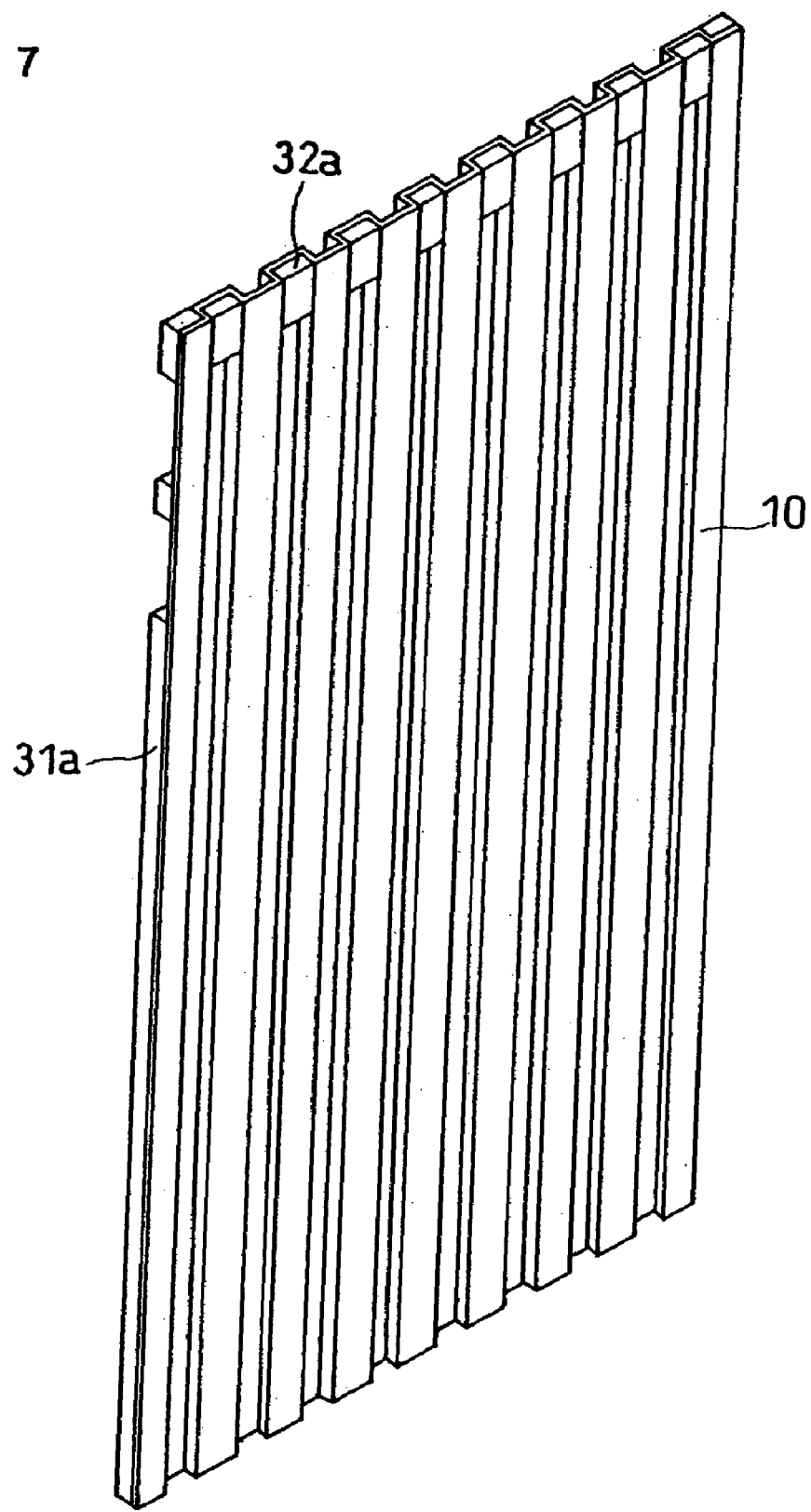
FIG. 7 is a perspective view illustrating another example of the corrugated metal plate.
Figure 8:
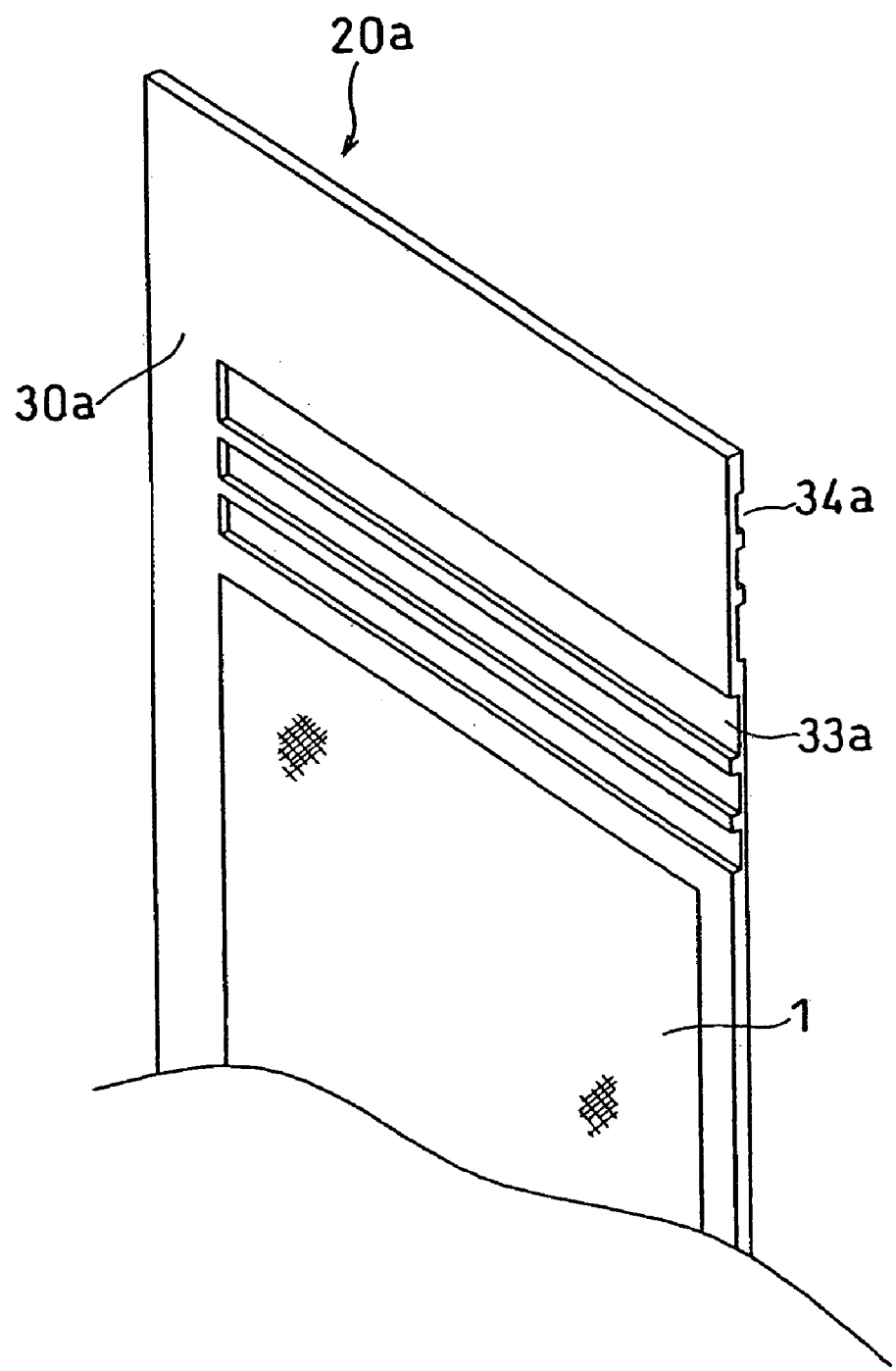
FIG. 8 is a perspective view illustrating the vital part of another example of the MEA.

In this embodiment, instead of the ribs 31 and 32 of the gasket 30, packings 31a and 32a composed of the same material as the gasket are integrally attached to the corrugated metal plate 10 by injection molding or the like, as shown in FIG. 7. An MEA 20a, which is to be combined with the conductive separator plate composed of such metal plate, is in the form of flat plate, as shown in FIG. 8. It further has gas guide grooves 33a and 34a.

Embodiment 3

Figure 9:
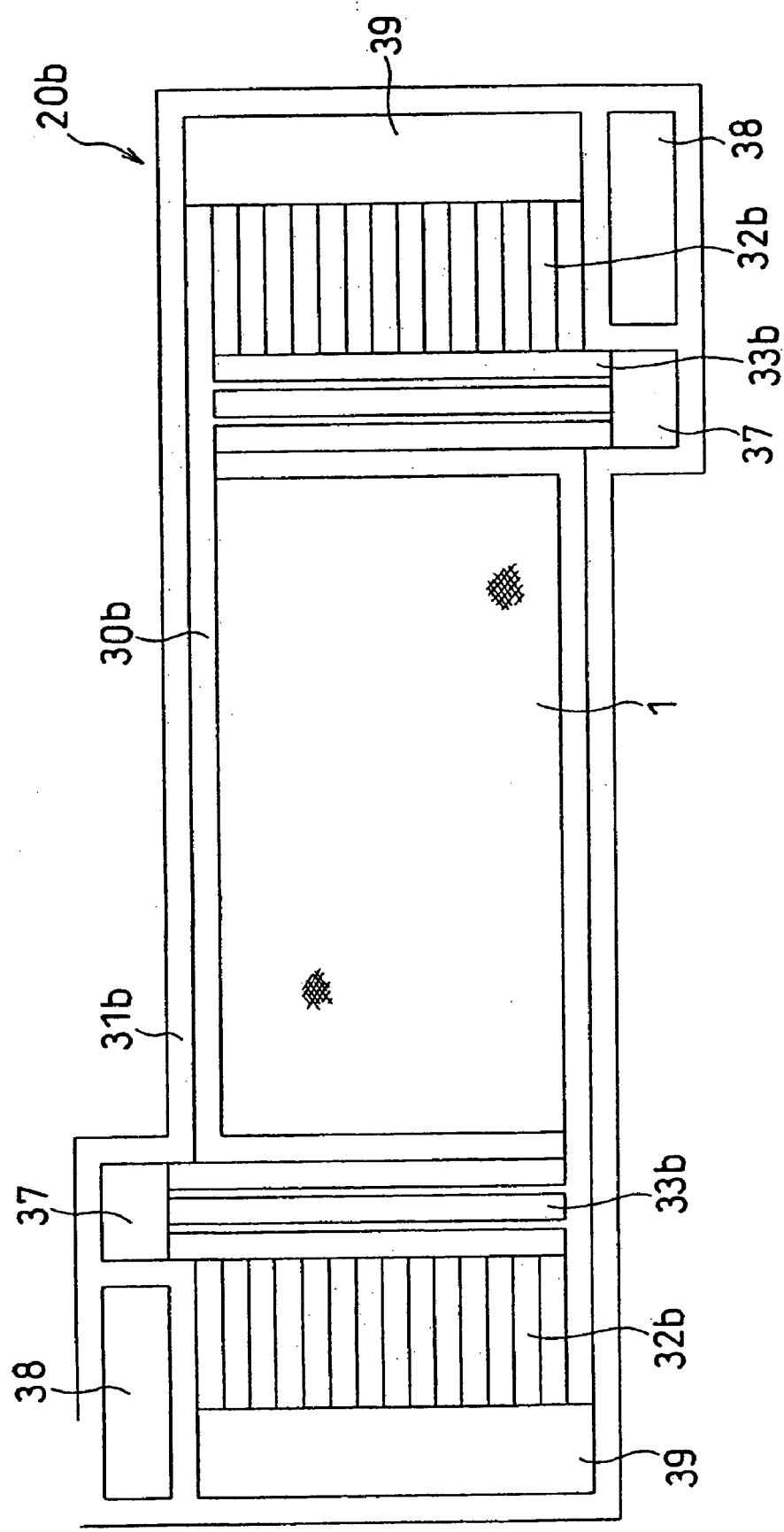
FIG. 9 is a front view illustrating still another example of the MEA.

FIG. 9 illustrates an MEA 20b. This MEA has the same structure as the MEA as shown in FIG. 2 except that the manifolds are formed. Specifically, a gasket 30b has a pair of grooves 33b for guiding the oxidant gas with the cathode of the electrode portion 1 therebetween and ribs 32b for closing the ends of the grooves 11 of the metal plate 10. Similarly, it has, on the anode-side, a pair of grooves for guiding the fuel gas (which corresponds to the groove 34 as shown in FIG. 2) and ribs for closing the ends of the grooves 12 of the metal plate 10.

The gasket 30b has oxidant gas manifolds 37 and fuel gas manifolds 38 formed on a side face of the grooves 33b for guiding the oxidant gas and the grooves for guiding the fuel gas, and further has cooling water manifolds 39 at both ends. The gasket 30b further has a rib 31b at its periphery.

In a cell stack comprising such MEAs, the oxidant gas supplied from one of the pair of manifolds 37 and one of the grooves 33b passes through the gas flow channels formed in the grooves 11 of the metal plate 10 and diffuses throughout the cathode, and an excessive gas and reaction products are discharged from the other groove 33b and the other manifold 37.

Similarly, the fuel gas is supplied from one of the pair of manifolds 38 to the anode and is discharged from the other. Also, cooling water enters from one of the manifolds 39 into water flow channels 35 formed between the pair of metal plates and is discharged from the other manifold.

Embodiment 4

Figure 10:
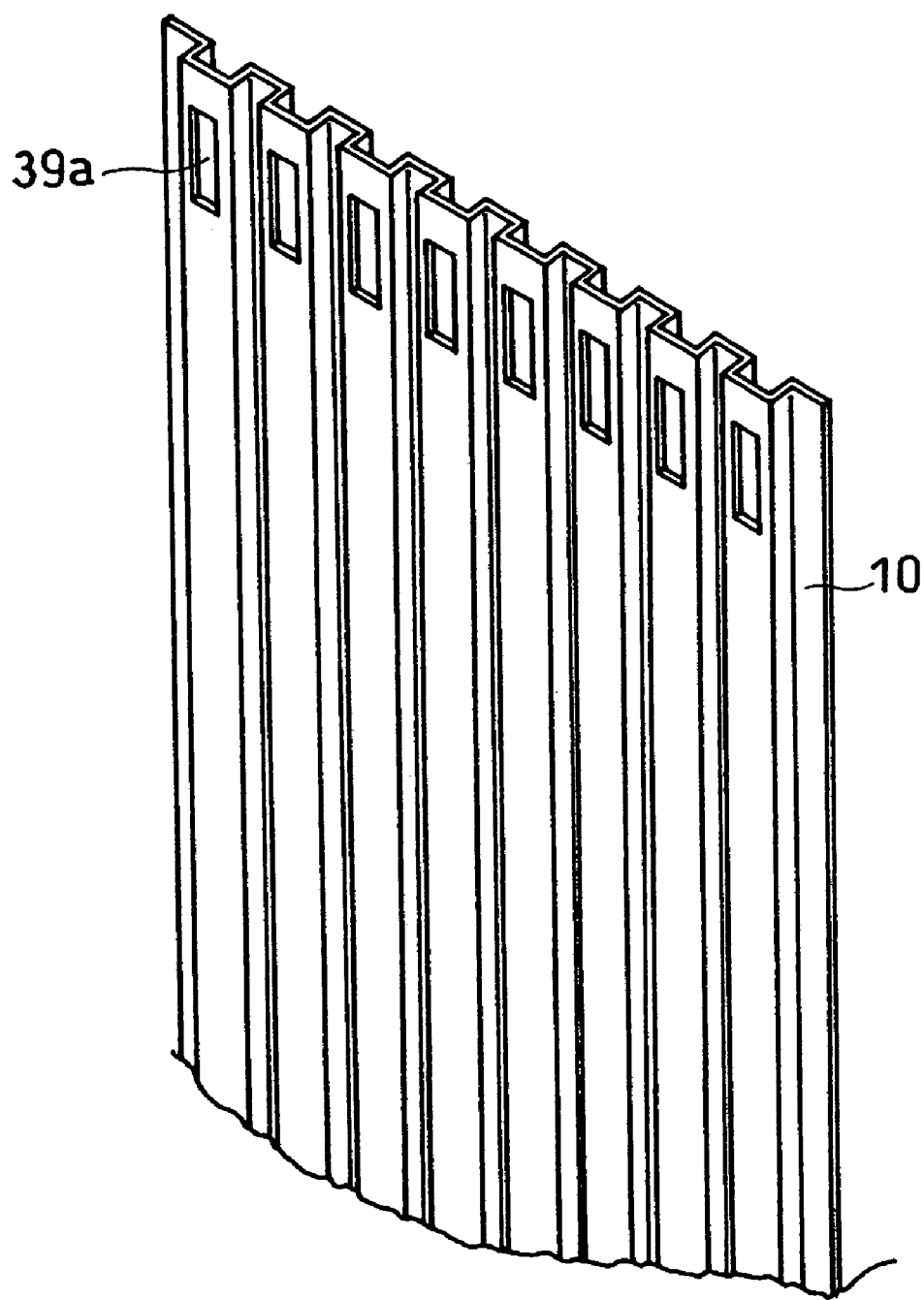
FIG. 10 is a perspective view illustrating still another example of the corrugated metal plate.

In this embodiment, the corrugated metal plate 10 is provided with cooling water manifold apertures 39a as shown in FIG. 10. Although not shown in the figure, the manifold apertures are also formed at the other end of the metal plate. Further, at an outer side of the manifold apertures 39, packings are arranged for closing the end of the water flow channels formed by the pair of metal plates.

The above-mentioned manifold apertures are formed so as to penetrate a gasket portion of the MEA, or a portion of the ribs 32 for closing the end of the gas flow channels if the MEA 20 of FIG. 2 is taken as an example for explanation.

In the structure of Embodiment 1, water is supplied to the flow channels having openings at both ends from one end of the flow channels and is discharged from the other end. In this embodiment, water is supplied from one of the pair of manifold apertures 39 to the respective flow channels 35 and is discharged from the manifold apertures at the other end. Cooling water passing through the manifold apertures is prevented from entering the flow channels of the oxidant gas and fuel gas by the ribs 32.

Embodiment 5

In this embodiment, gas and cooling water flow channels are adjusted by the corrugated metal plate and packings combined therewith.

Figure 11:
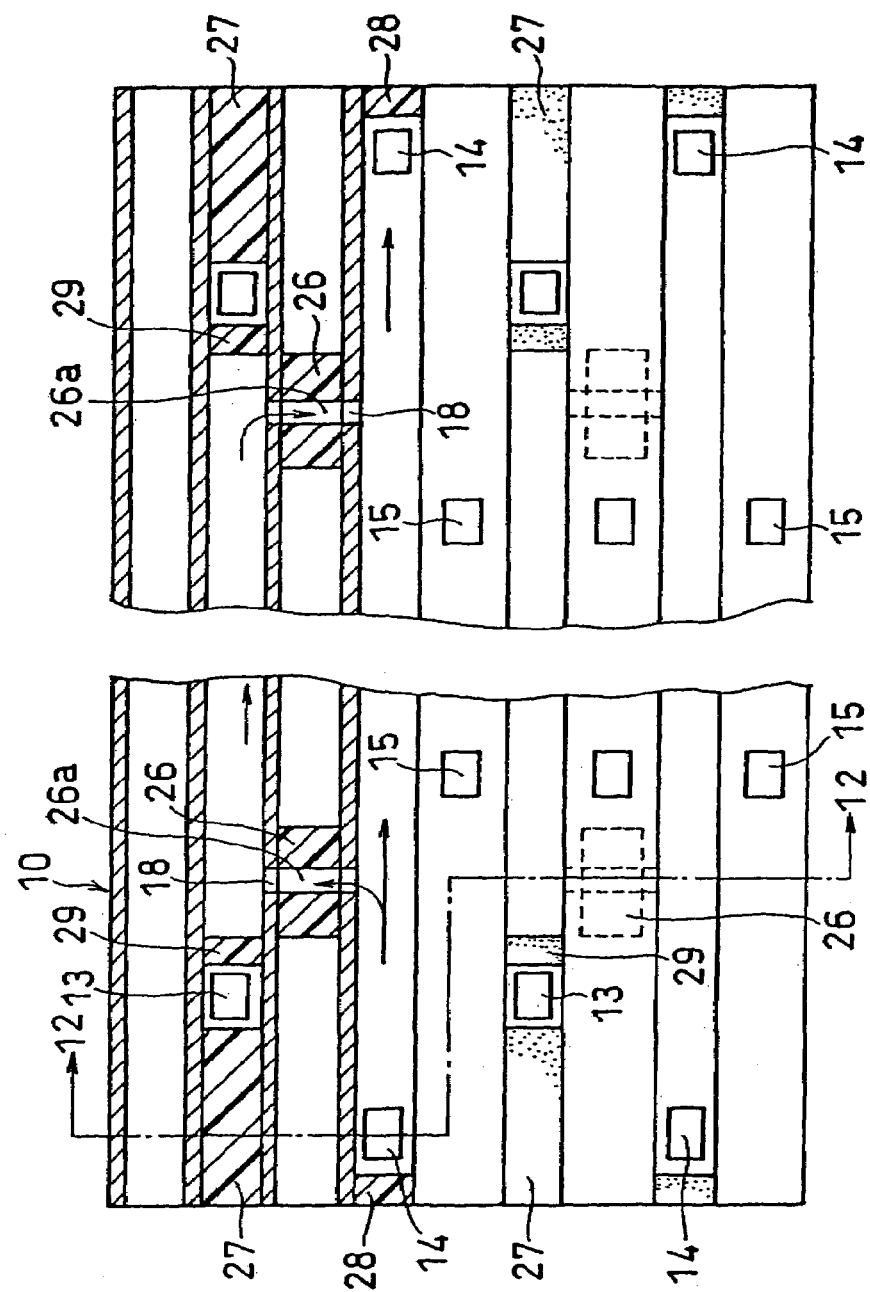
FIG. 11 is a partially cross-sectional front view illustrating still another example of the corrugated metal plate.
Figure 12:
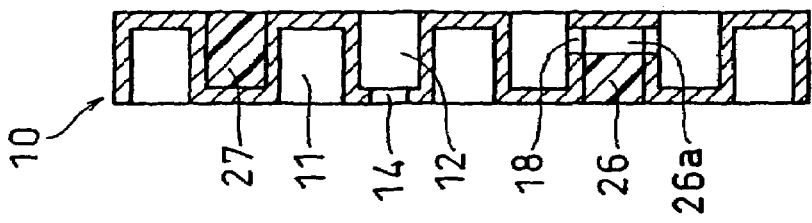
FIG. 12 is a cross-sectional view of FIG. 11 cut by line 12—12.
Figure 13:
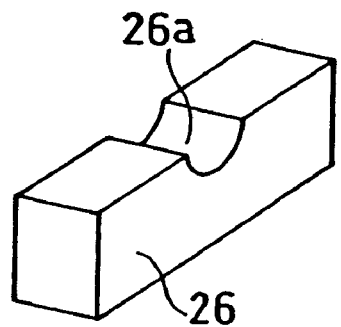
FIG. 13 is a perspective view of a packing to be combined with the same corrugated metal plate.

FIG. 11 is a front view of the corrugated metal plate 10 from the anode-side thereof. The corrugated metal plate 10 has a pair of cooling water manifold apertures 15 formed on the front side of FIG. 11, i.e., on the ridge that is in contact with the anode; the pair of manifold apertures 15 is formed at a portion close to the electrode portion 1 of the MEA with the electrode portion situated therebetween. In the bottom of the grooves 12 that are open to the front side of FIG. 11, fuel gas manifold apertures 14 and oxidant gas manifold apertures 13 are alternately formed. The manifold aperture 14 is positioned at the ends of the corrugated metal plate 10 and the manifold aperture 13 is positioned midway between the manifold apertures 14 and 15. In the groove 12, since packings 27 and 29 are arranged on both sides of the manifold aperture 13, the oxidant gas flowing in the manifold aperture 13 does not flow into the groove 12.

Meanwhile, in the groove 12 having the fuel gas manifold apertures 14, since a packing 28 is arranged only at an outer portion of the manifold aperture 14, the fuel gas flowing in the supply-side manifold aperture 14 flows into the groove 12 and is discharged from the other manifold aperture 14. Further, the gas flowing into the groove 12 passes through a notch 26a that is in the center of a packing 26 arranged in an adjacent groove 11 and holes 18 formed in the metal plate so as to communicate with the notch and flows into the next groove 12 across the groove 11. The gas flow passes through a portion having another packing 26, returns to the original groove 12 across the groove 11, and is discharged from the other manifold aperture 14. The gas flow is shown by arrows in FIG. 11.

As described above, the fuel gas manifold apertures 14 are formed in the bottom of every other anode-facing groove 12 of the corrugated metal plate 10, and by using the holes 18 of the groove 11 formed between the grooves 12 so as to open to the other side and the packings 26, the fuel gas can be distributed into the groove 12 having no manifold aperture to be supplied for reaction.

The pair of manifold apertures 15 is for circulation of cooling water; water is supplied and discharged therethrough to and from a flow channel which is formed by the grooves 11 between the corrugated metal plate 10 as shown in the figure and the metal plate combined in such a manner that the grooves 11 face each other. Although not shown in the figure, a packing is arranged at an outer side of the apertures 15 of the groove 11 in order to prevent leakage of water.

The corrugated metal plate to be laminated to the surface of the corrugated metal plate 10 of FIG. 11 with the MEA interposed therebetween has the grooves 11 which form the gas flow channels for supplying the oxidant gas to the MEA. Also, by forming what are equivalent to the packings 26 and the holes 18, which have been descried above with respect to the fuel gas, on the groove 12 side, the oxidant gas supplied to one groove 11 can be distributed to an adjacent groove 11 across the groove 12 by penetrating a portion of the groove 12.

Figure 14:
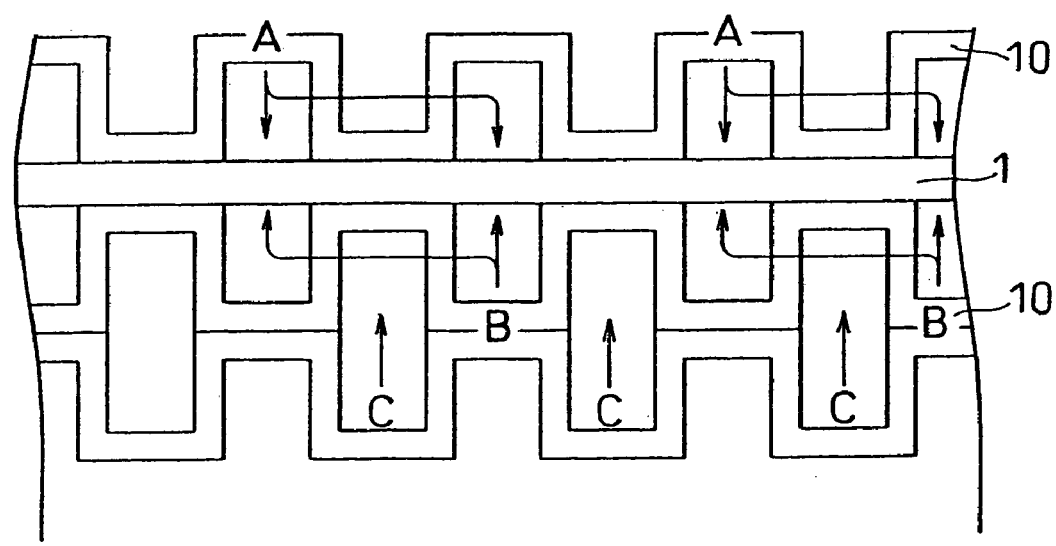
FIG. 14 is a schematic view illustrating the flow of gases and cooling water.

In FIG. 14, the flows of the oxidant gas, fuel gas and cooling water are represented by arrows A, B and C, respectively.

Embodiment 6

This embodiment uses conductive separator plates each consisting of a corrugated metal plate 50 and a gasket attached to its periphery. The corrugated metal plate 50 used here has the same structure as the corrugated metal plate 10 used in Embodiment 1, but is different in that it has almost the same size as the electrode portion of the MEA.

Figure 15:
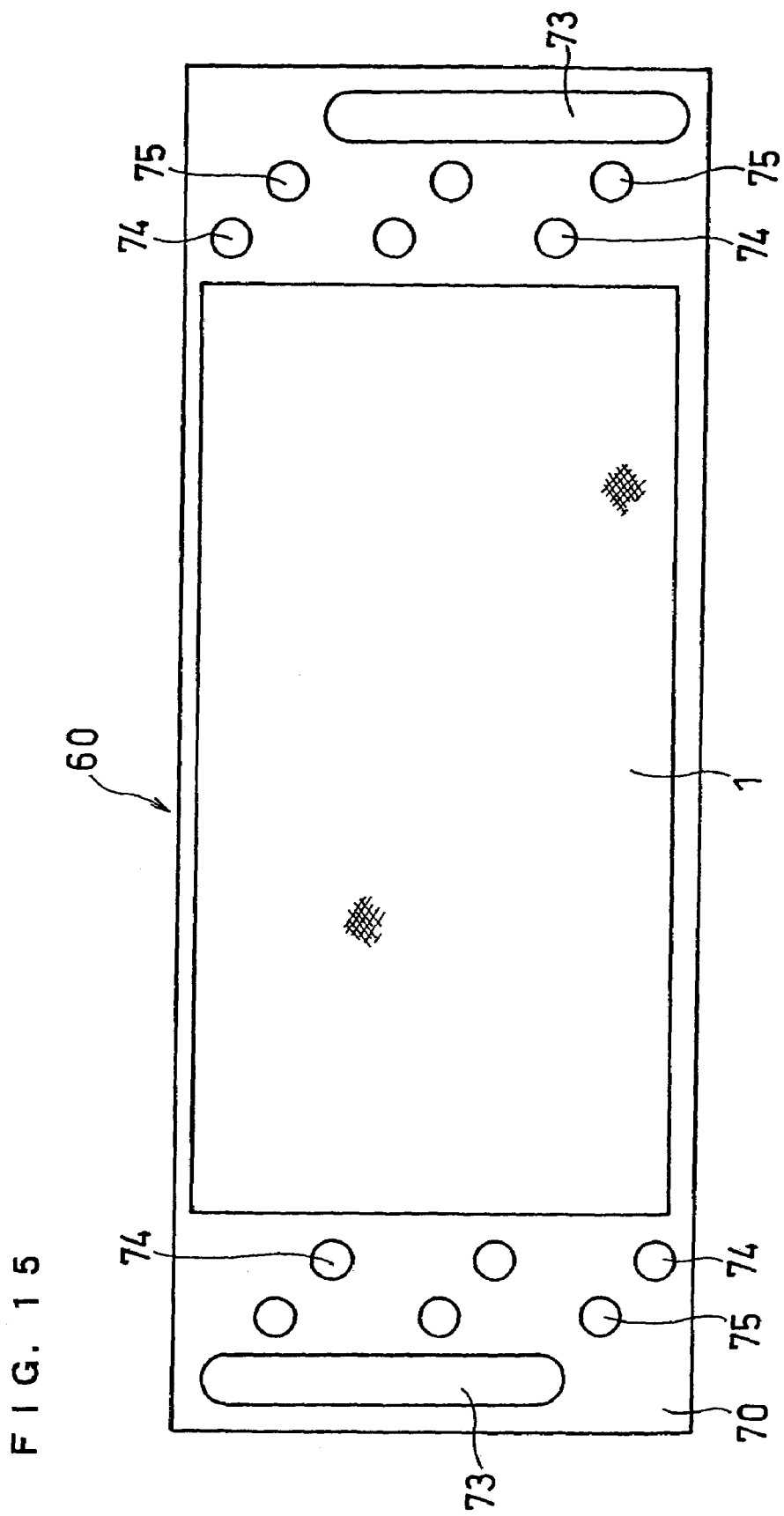
FIG. 15 is a front view illustrating still another example of the MEA.

FIG. 15 illustrates an MEA which is seen from the anode-side. The MEA 60 is composed of a polymer electrolyte membrane, a gasket 70 supporting its periphery, and an anode and a cathode attached to exposed surfaces of the electrolyte membrane in the same manner as in Embodiment 1. The gasket 70 has an oxidant gas manifold aperture 73 on both ends in the longitudinal direction of the MEA, one on the inlet-side and the other on the outlet-side. The gasket 70 further has three fuel gas manifold apertures 74 and three cooling water manifold apertures 75 on both ends.

Figure 16:
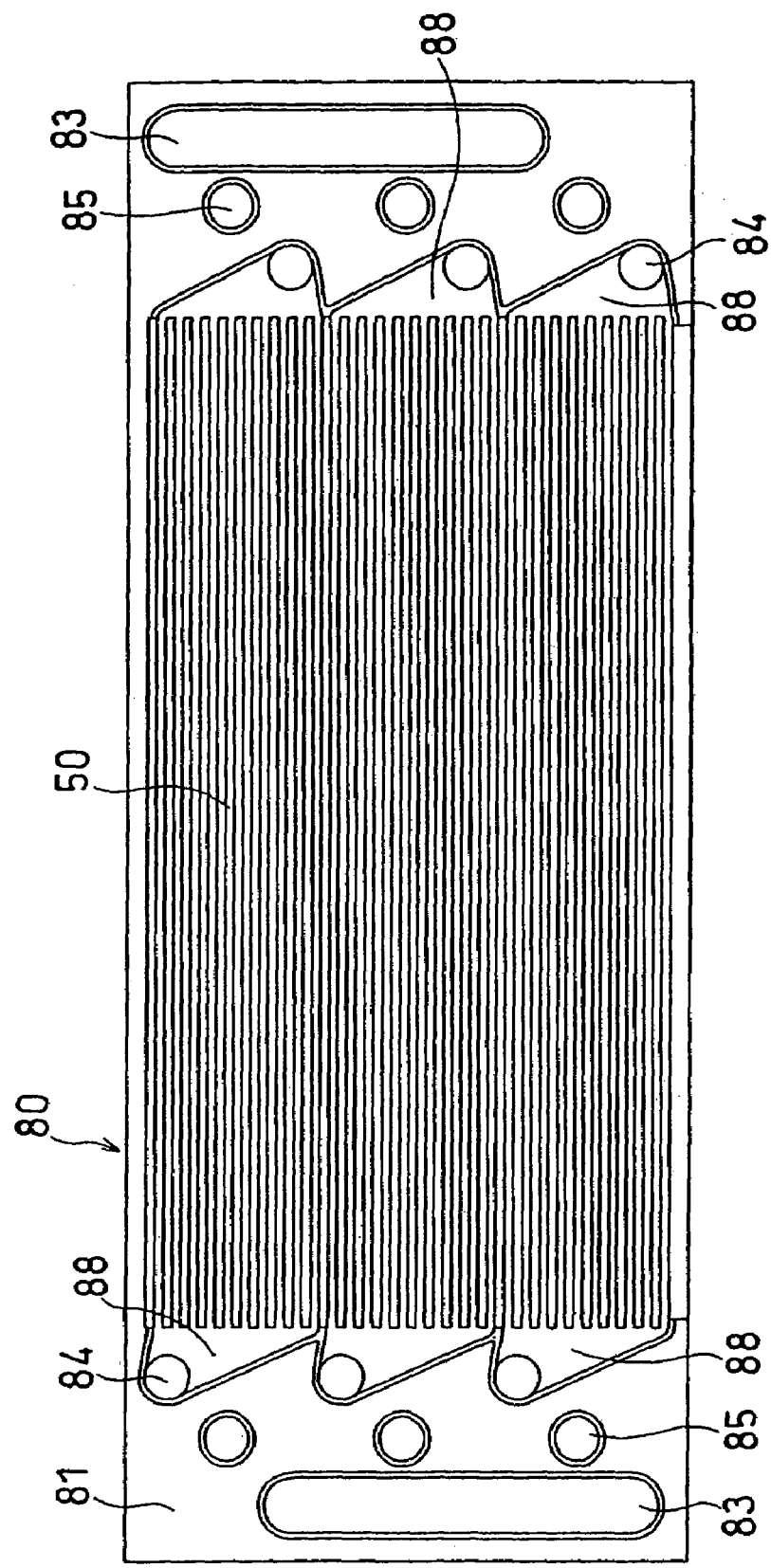
FIG. 16 is a front view illustrating the anode side of another example of the conductive separator plate.
Figure 17:
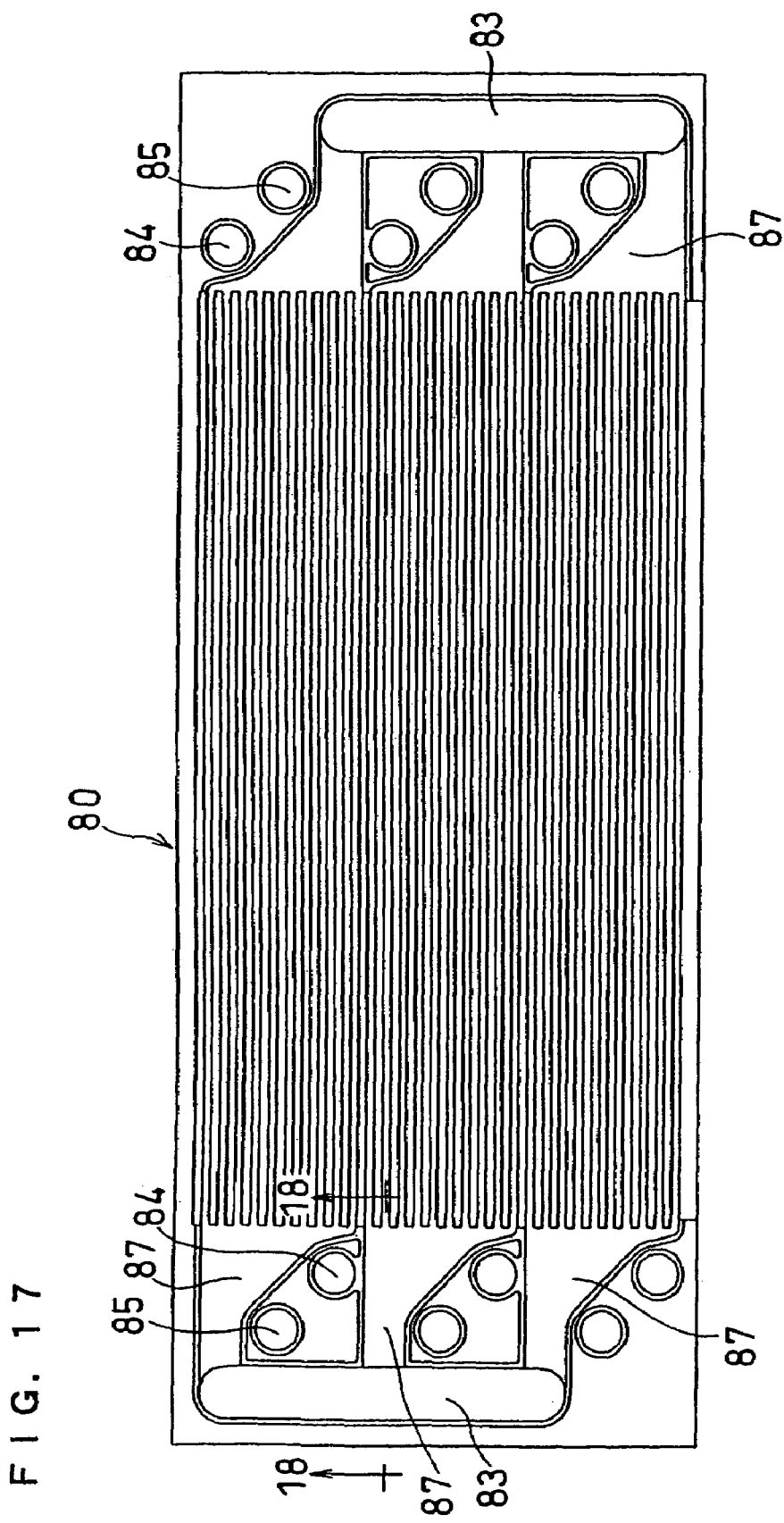
FIG. 17 is a front view illustrating the cathode side of the same separator plate.

FIG. 16 and FIG. 17 illustrate a conductive separator plate 80 that comes in contact with the anode on one side and comes in contact with the cathode on the other side. The separator plate 80 is composed of the corrugated metal plate 50 and a gasket 81 attached to its periphery, and the gasket 81 has oxidant gas manifold apertures 83, fuel gas manifold apertures 84 and cooling water manifold apertures 85, which are in common with the MEA 60.

The separator plate 80 has fuel gas flow channels formed by grooves 54 of the metal plate 50 and guide grooves 88 for connecting the ends of the flow channels with the manifold apertures 84 on the anode-side. Similarly, the separator plate 80 has oxidant gas flow channels formed by grooves 53 of the metal plate 50 and guide grooves 87 for connecting the ends of the flow channels with the manifold apertures 83 on the cathode-side.

Figure 18:
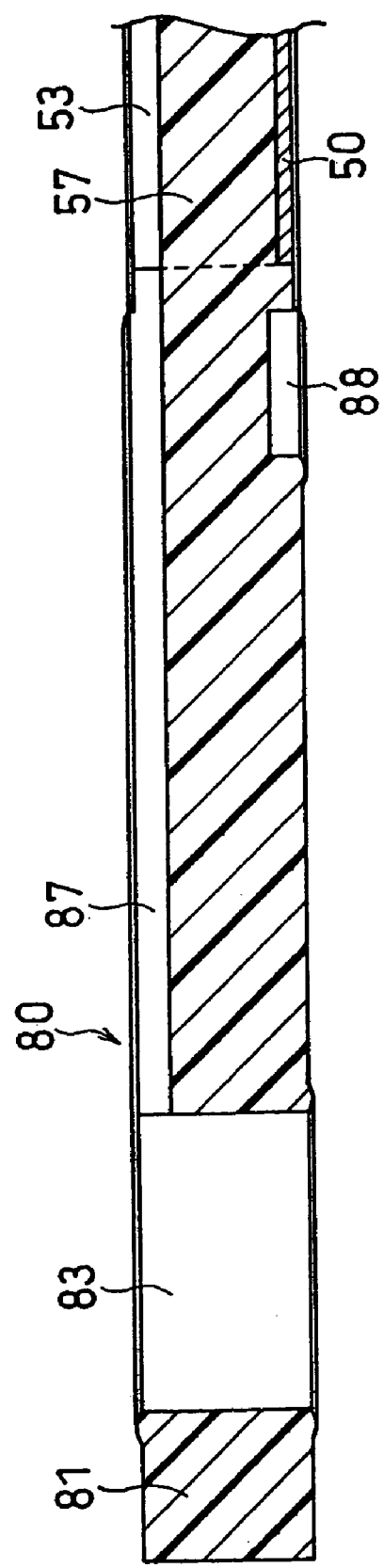
FIG. 18 is a cross-sectional view of FIG. 17 cut by line 18—18.

FIG. 18 is a cross-sectional view of the separator plate 80 cut by line 18—18 of FIG. 17. It clearly shows that the oxidant gas supplied from the manifold aperture 83 is guided by the guide groove 87 into the groove 53 of the corrugated metal plate 50. It is noted that two thirds of the depth of the groove 53 forming the gas flow channel of the metal plate 50 is filled with a sealing material 57 integral with the gasket 81 such that the gas flow channel 53 of the metal plate and the gas guide groove 87 of the gasket 81 have the same depth and thus communicate with each other steplessly. This facilitates the supply and discharge of the gas and prevents water vapor for humidification and reaction products from building up, so that cell performance will not be impaired by flooding.

Figure 23:
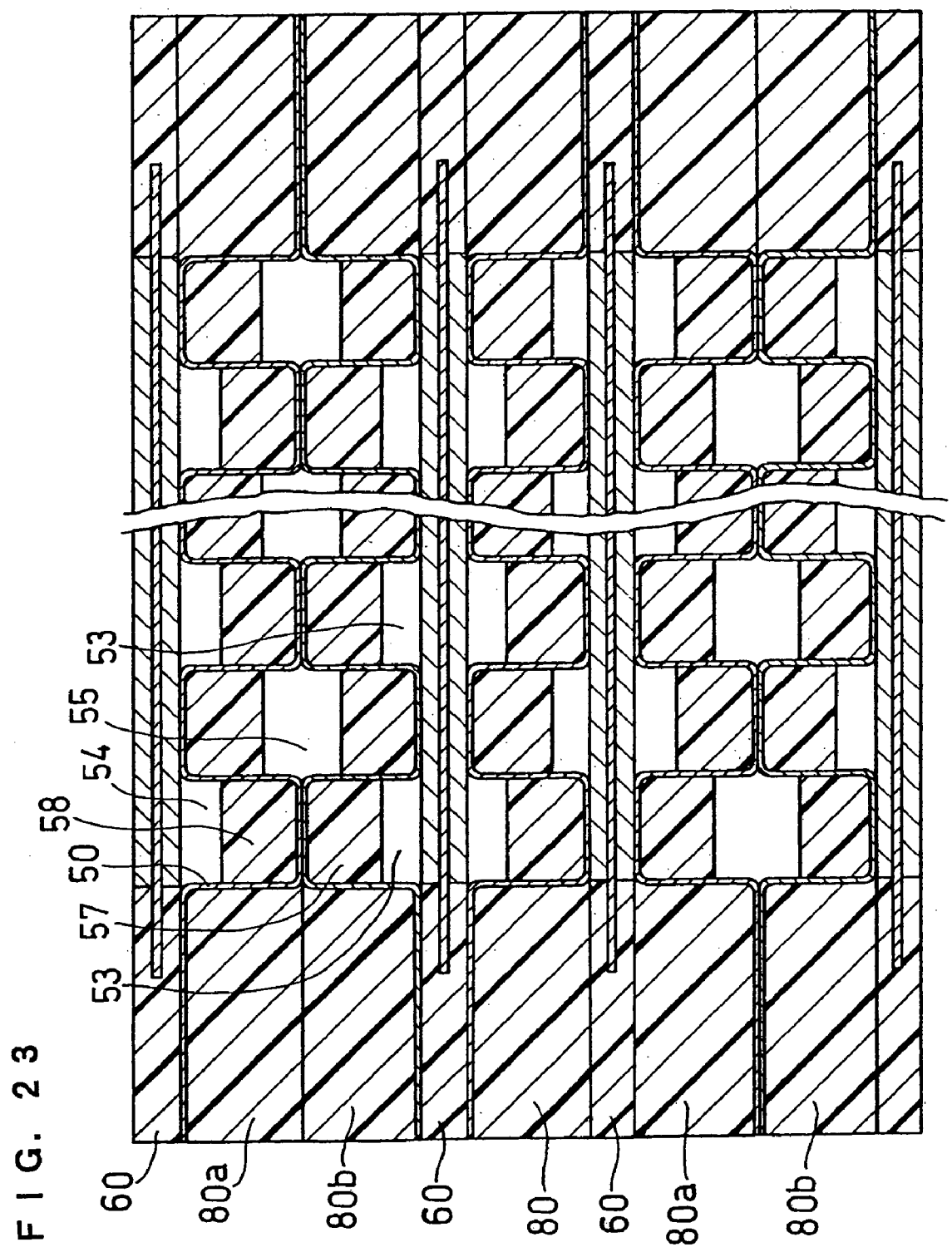
FIG. 23 is a cross-sectional view illustrating another example of the cell stack.

As shown in FIG. 23, two thirds of the depth of the groove 54 of the corrugated metal plate 50 forming a fuel gas flow channel is similarly filled with a sealing material 58 such that the gas flow channel 54 communicates with the gas guide groove 88 of the gasket 81 steplessly.

Figure 24:
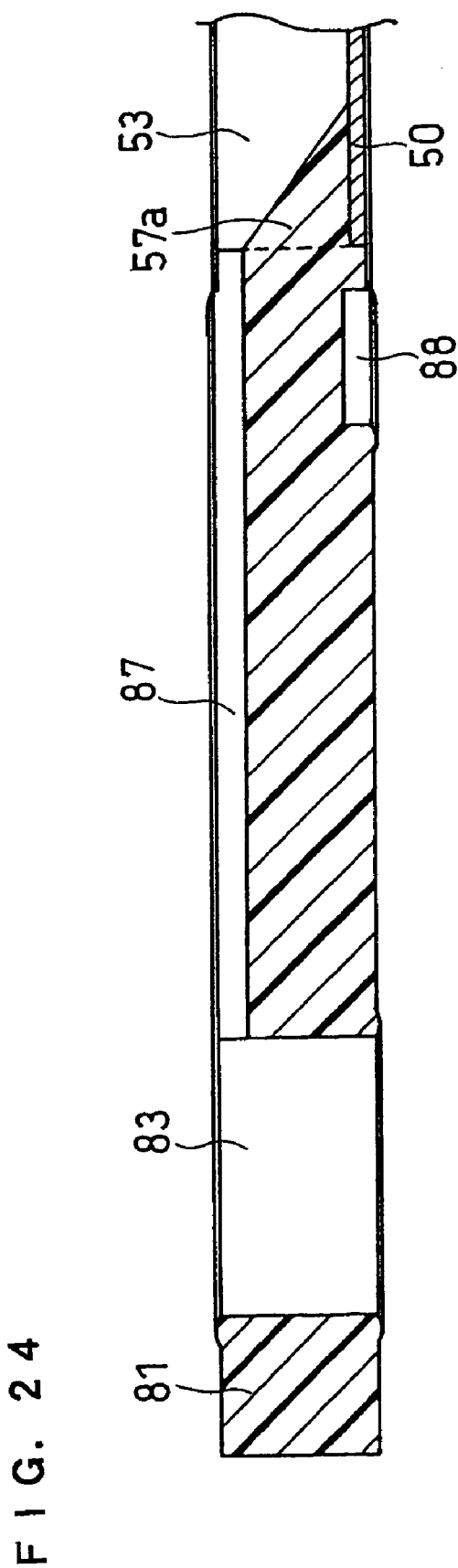
FIG. 24 is a cross-sectional view illustrating the vital part of still another example of the conductive separator plate.

FIG. 24 is a cross-sectional view of a conductive separator plate in another example cut by what is equivalent to line 18—18 of FIG. 17. In this example, the groove of the corrugated metal plate is not filled with a sealing material. Thus, there is a step between the guide groove of the gasket and the groove of the corrugated metal plate.

Next, separator plates constituting the cooling section will be described.

Figure 19:
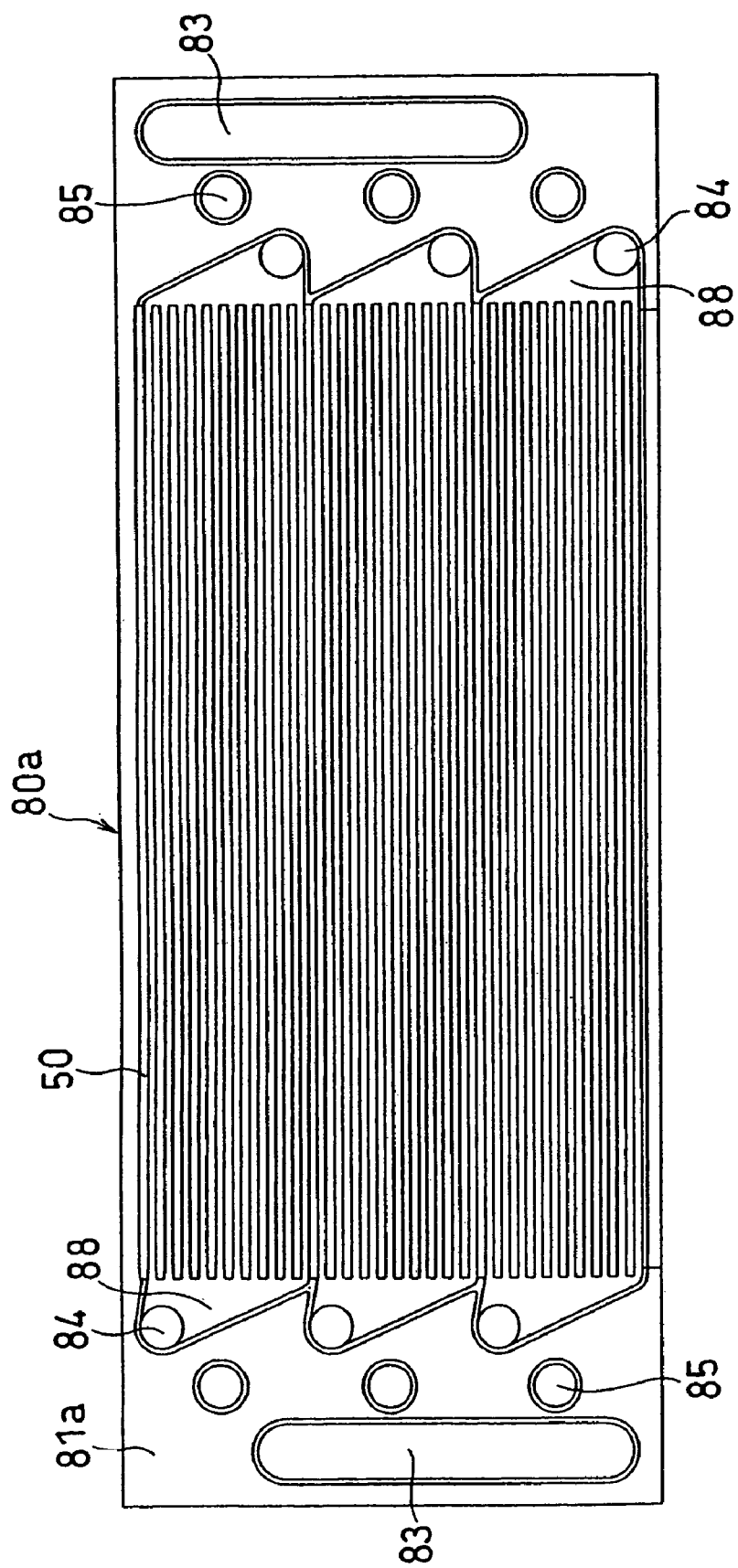
FIG. 19 is a front view illustrating the anode side of still another example of the conductive separator plate.
Figure 20:
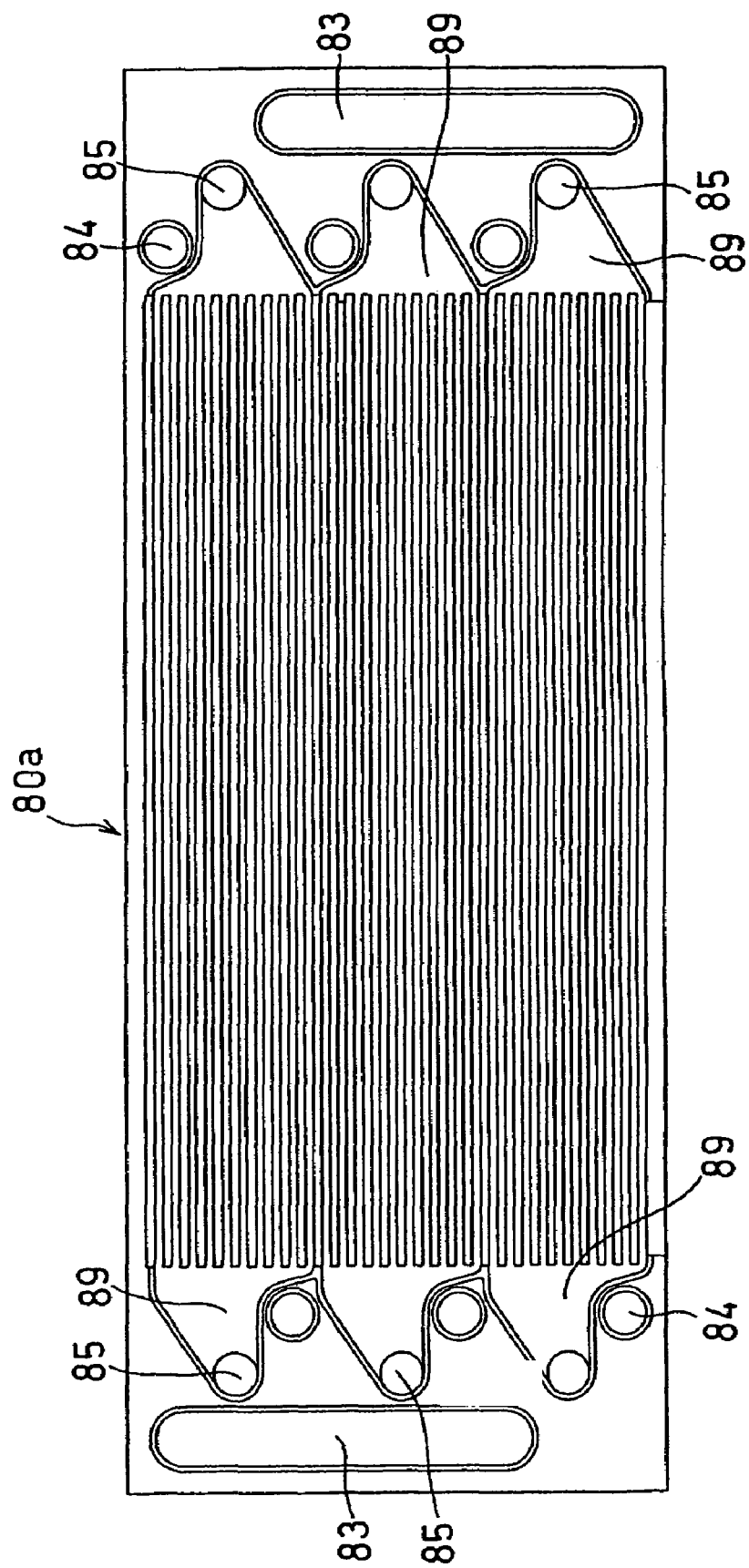
FIG. 20 is a view illustrating the backside of the same separator plate.

FIG. 19 is a front view of an anode-side separator plate and FIG. 20 is a backside view thereof. The separator plate 80a is the same as the separator plate 80 in that a gasket 81a has the respective manifold apertures for oxidant gas, fuel gas and cooling water and has, on the anode-side, the guide grooves 88 for connecting the manifold apertures 84 with the gas flow grooves of the metal plate 50. The difference is that it has, on the backside, guide grooves 89 for connecting the manifold apertures 85 with the cooling water flow channels of the metal plate 50.

Figure 21:
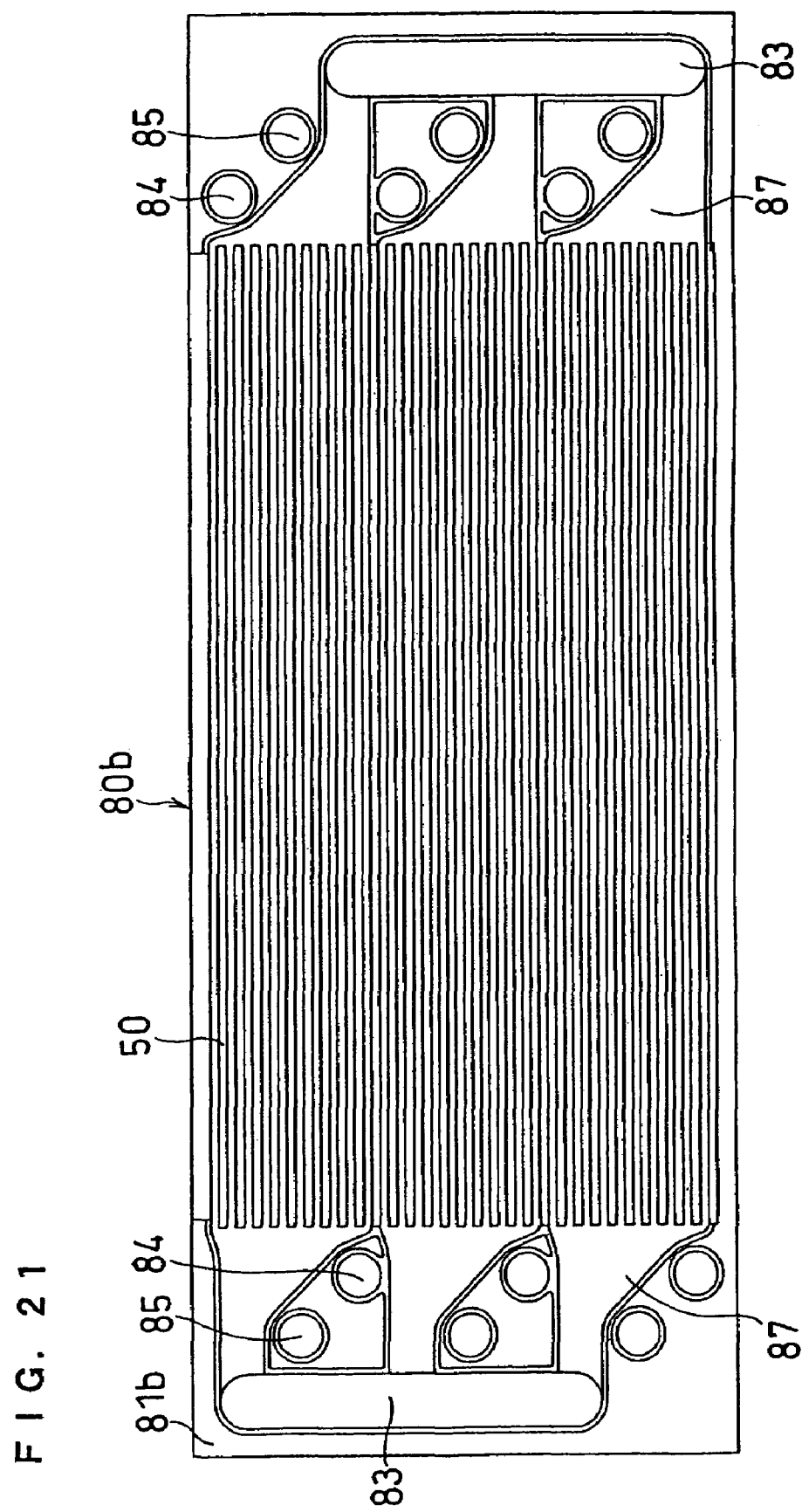
FIG. 21 is a front view illustrating the cathode side of another example of the conductive separator plate.
Figure 22:
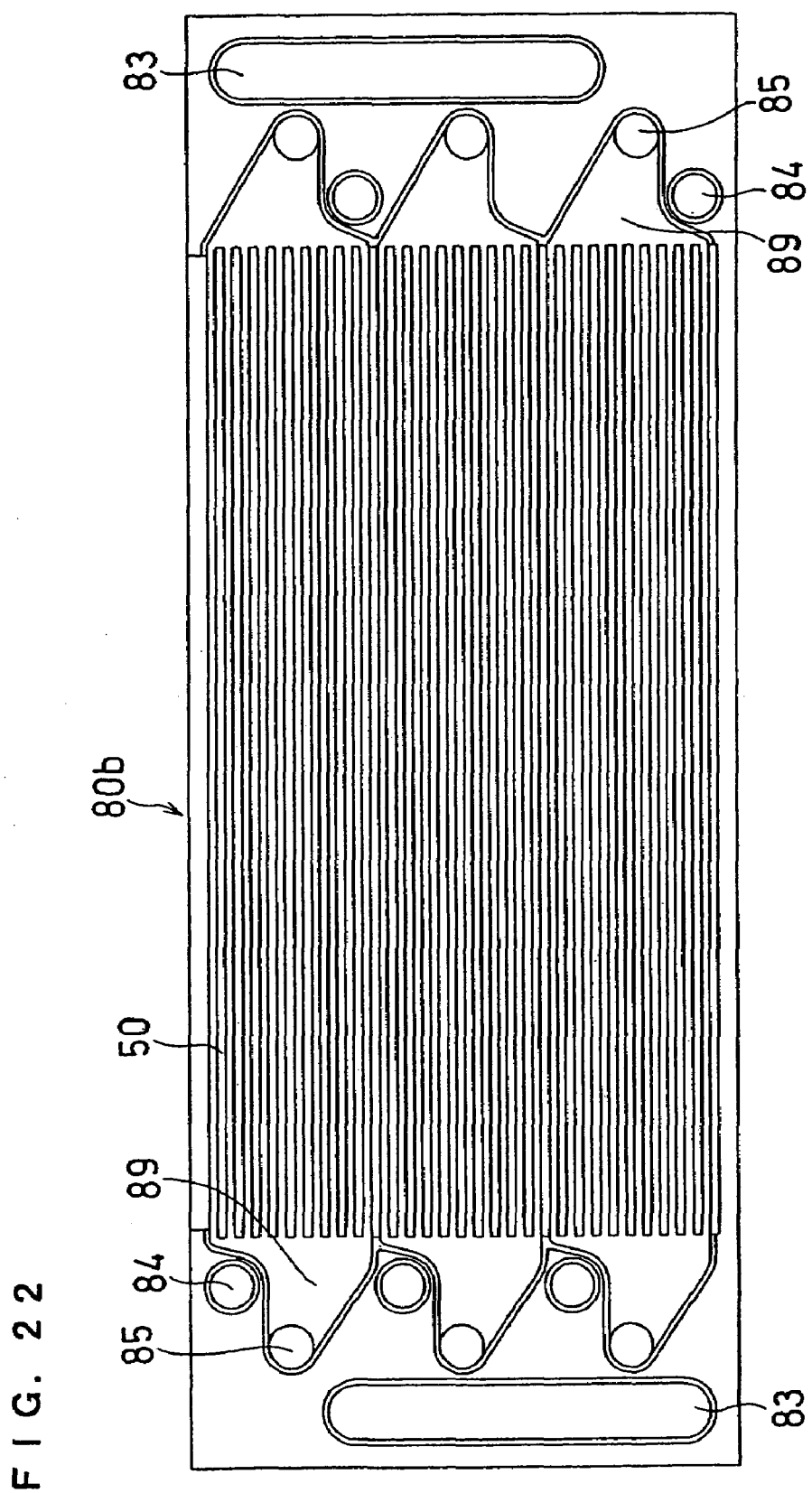
FIG. 22 is a view illustrating the backside of the same separator plate.

FIG. 21 and FIG. 22 illustrate a cathode-side separator plate 80b, which is combined with the separator plate 80a to form the cooling section. It is the same as the separator plate 81 in that it has manifold apertures for oxidant gas, fuel gas and cooling water and has, on the cathode-side, guide grooves 87 for connecting the manifold apertures 83 with the gas flow channels of the metal plate; it has, on the backside, guide grooves 89 for connecting the manifold apertures 85 with water flow channels of the metal plate in the same manner as in the separator plate 80a. Both the anode-side separator plate 80a and the cathode-side separator plate 80b are configured such that the depth of the water guide grooves 89 formed on the opposing surfaces is the same as the depth of the water flow channels of the corrugated metal plate. This is clearly shown in FIG. 23.

The guide grooves 87, 88 and 89 as described above may be provided with such a porous material or a spacer of the corrugated metal plate as described in Embodiment 1, thereby preventing the deformation of the gasket into these grooves due to the clamping pressure of the cell to avoid inhibition of gas or cooling water circulation.

EXAMPLE 1

A catalyst powder was prepared by making acetylene black carry platinum particles having an average particle size of about 30 Å in a weight ratio of 3:1. A dispersion of this catalyst powder in isopropanol was mixed with a dispersion of perfluorocarbon sulfonic acid powder represented by the following formula (wherein m=1, n=2, $5 \leq x \leq 13.5$, and $y \approx 1000$) in ethyl alcohol, to prepare a paste. This paste was printed on one side of a 250 μm thick carbon fiber nonwoven fabric by screen printing to form a catalyst layer. The amount of the paste applied was adjusted so that the amount of platinum contained in the electrode became 0.5 mg/cm² and the amount of perfluorocarbon sulfonic acid became 1.2 mg/cm².

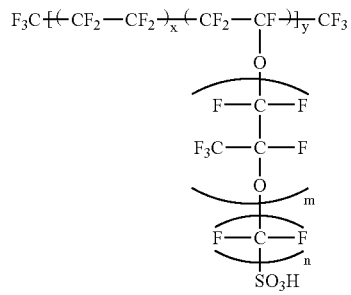

A cathode and an anode having the same structure thus obtained were attached, by hot pressing, to both sides of the center part of a hydrogen-ion conductive polymer electrolyte membrane having an area slightly larger than that of the electrode in such a manner that the catalyst layer was in contact with the electrolyte membrane; this gave an electrolyte membrane-electrode assembly (MEA). The hydrogen-ion conductive polymer electrolyte membrane used in this example was a 25 μm thick thin film of perfluorocarbon sulfonic acid represented by the above-mentioned formula (wherein m=2, n=2, $5 \leq x \leq 13.5$, and $y \approx 1000$).

As the conductive separator plate, a stainless steel SUS304 plate having a thickness of 0.1 mm was press worked into a corrugated plate having grooves of about 1.5 mm in depth and about 1.5 mm in width at a pitch of 3 mm. The surface of the corrugated metal plate was applied with a gold layer having a thickness of 0.01 μm by vacuum electron beam deposition. Deposition was conducted under an Ar gas atmosphere having a vacuum of $5 \times 10^{-6}$ Torr at a metal plate temperature of 200° C.

The MEA has a gasket of EPDM at the periphery of the polymer electrolyte membrane. The gasket was bonded to the electrolyte membrane at a moulding temperature of 170° C. before the electrodes were attached thereto. This produced the MEA having the gasket integral therewith and a structure as shown in FIG. 2.

The conductive separator plates and MEAs produced in the above manner were alternately stacked, wherein two corrugated metal plates, combined in such a manner that their grooves faced each other, were inserted between the MEAs every two cells. This produced a cell stack of 50 cells having a structure as shown in FIGS. 4 to 6. The clamping pressure of the cell stack was 20 kgf/cm².

While the resultant fuel cell was held at 85° C., a hydrogen gas humidified and heated to have a dew point of 83° C. was supplied to the anode-side and air humidified and heated to have a dew point of 78° C. was supplied to the cathode-side. This resulted in a cell open-circuit voltage of 50 V at the time of no load when no current was output to outside. This cell was subjected to a power generation test under the conditions of a fuel utilization rate of 80%, oxygen utilization rate of 40% and current density of 0.5 A/cm²; as a result, it was confirmed that the cell output of 990 W(22V–45 A) was maintained.

In this example, the guide grooves 33 and 34 were composed of a plurality of parallel grooves. When these grooves were provided with carbon paper subjected to hydrophilicity treatment, similar effects could be obtained. The hydrophilicity treatment of the carbon paper was conducted by ultraviolet radiation with a very high pressure mercury lamp having a wavelength of 365 nm at an intensity of 100 mW/cm for five minutes.

EXAMPLE 2

An MEA as shown in FIG. 15 was prepared using the same electrodes, electrolyte membrane and gasket material as those of Example 1. Meanwhile, as for the conductive separator plate, a gasket composed of silicone rubber was formed on the periphery of a corrugated metal plate similar to that of Example 1. Three kinds of conductive separator plates as described in Embodiment 6 were produced and combined with the above-described MEAs to form a fuel cell comprising a stack of 50 cells. The cooling section was inserted every two cells. The gasket portion of the conductive separator plate was provided with projections having a height of 0.1 mm at its outer periphery and the periphery of the manifold apertures in order to securely seal the conductive separator plate and the MEA when the cell stack was formed. The depth of the grooves of the separator plate, serving as the gas flow channels, and the depth of the guide grooves of the gasket portion were 0.5 mm.

The resultant fuel cell was operated under the same conditions as those of Example 1 and was found to have almost the same performance as that of Example 1.

INDUSTRIAL APPLICABILITY

According to the present invention, instead of the conventional cutting procedure of carbon plates, separator plates can be produced without cutting metallic materials such as stainless steel, so that effective mass production and significant cost reduction are possible. Also, since the separator plates can be made thinner, the fuel cell can be made more compact.

The invention claimed is:

1. A polymer electrolyte fuel cell comprising: a plurality of conductive separator plates; an electrolyte membrane-electrode assembly inserted between said separator plates, said electrolyte membrane-electrode assembly comprising a hydrogen-ion conductive polymer electrolyte membrane having its periphery covered with a first gasket, an anode attached to one side of said electrolyte membrane, and a cathode attached to the other side of said electrolyte membrane; and gas charge and discharge device for charging and discharging a fuel gas and an oxidant gas to and from said anode and cathode, respectively, wherein said conductive separator plate comprises: a corrugated metal plate having ridges and grooves that are alternately formed in parallel along the substantially entire length such that the ridges and grooves on one side correspond to the grooves and ridges on the other side, respectively; and a second gasket attached to the periphery of the corrugated metal plate, said first and second gaskets have common respective manifold apertures for fuel gas and oxidant gas, and said second gasket has: guide grooves formed on an anode-facing side for connecting said manifold apertures for fuel gas with the grooves of said corrugated metal plate; and guide grooves formed on a cathode-facing side for connecting said manifold apertures for oxidant gas with the grooves of said corrugated metal plate.

2. The polymer electrolyte fuel cell in accordance with claim 1, wherein the conductive separator plate including said second gasket has a sealing material integral with said second gasket that is to be filled into the bottom of the grooves of said corrugated metal plate such that the depth of the grooves of said corrugated metal plate is almost equal to the depth of the gas guide grooves for connecting said manifold apertures with the grooves of the corrugated metal plate.

3. A polymer electrolyte fuel cell comprising: a plurality of conductive separator plates, each comprising a corrugated metal plate having ridges and grooves that are alternately formed in parallel such that the ridges and grooves on one side correspond to the grooves and ridges on the other side, respectively; an electrolyte membrane-electrode assembly inserted between said separator plates, said electrolyte membrane-electrode assembly including a hydrogen-ion conductive polymer electrolyte membrane having its periphery covered with a gasket, an anode attached to one side of said electrolyte membrane, and a cathode attached to the other side of said electrolyte membrane; and gas charge and discharge device for charging and discharging a fuel gas and an oxidant gas to and from said anode and cathode, respectively, wherein said gasket has, on both sides, ribs that close both ends, in the longitudinal direction, of the grooves of said corrugated metal plates which said gasket faces, and said gas charge and discharge device comprises, at an inner side of said ribs of said gasket, fuel gas guide grooves that are formed on one side of the gasket so as to open to a side face of the gasket and communicate with the grooves of said metal plate and oxidant gas guide grooves that are formed on the other side of the gasket so as to open to a side face of the gasket and communicate with the grooves of said metal plate.

4. A polymer electrolyte fuel cell comprising: a plurality of conductive separator plates, each comprising a corrugated metal plate having ridges and grooves that are alternately formed in parallel such that the ridges and grooves on one side correspond to the grooves and ridges on the other side, respectively; an electrolyte membrane-electrode assembly inserted between said separator plates, said electrolyte membrane-electrode assembly including a hydrogen-ion conductive polymer electrolyte membrane having its periphery covered with a gasket, an anode attached to one side of said electrolyte membrane, and a cathode attached to the other side of said electrolyte membrane; and gas charge and discharge device for charging and discharging a fuel gas and an oxidant gas to and from said anode and cathode, respectively, wherein said gas charge and discharge device comprises: manifold apertures formed in every other groove of said corrugated metal plate facing the electrolyte membrane-electrode assembly; and gas flow controlling means including packings that allow the gas flowing into the groove having said manifold apertures to move into the groove having no manifold aperture across the groove that is formed on the other side between both grooves.

* * * * *